US011102108B2

(12) United States Patent
Johnsen et al.

(10) Patent No.: US 11,102,108 B2
(45) Date of Patent: Aug. 24, 2021

(54) SYSTEM AND METHOD FOR A MULTICAST SEND DUPLICATION INSTEAD OF REPLICATION IN A HIGH PERFORMANCE COMPUTING ENVIRONMENT

(71) Applicant: ORACLE INTERNATIONAL CORPORATION, Redwood Shores, CA (US)

(72) Inventors: Bjørn Dag Johnsen, Oslo (NO); Stephen McKinty, Theys (FR); Predrag Hodoba, Asker (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 278 days.

(21) Appl. No.: 16/261,362

(22) Filed: Jan. 29, 2019

(65) Prior Publication Data

US 2019/0319874 A1 Oct. 17, 2019

Related U.S. Application Data

(63) Continuation-in-part of application No. 16/115,138, filed on Aug. 28, 2018.

(Continued)

(51) Int. Cl.

*H04L 12/707* (2013.01)
*H04L 12/761* (2013.01)
*H04L 29/08* (2006.01)

(52) U.S. Cl.

CPC .............. *H04L 45/24* (2013.01); *H04L 45/16* (2013.01); *H04L 67/10* (2013.01)

(58) Field of Classification Search

None

See application file for complete search history.

(56) References Cited

U.S. PATENT DOCUMENTS 7,991,006 B2 8/2011 Reiss
10,135,947 B1 * 11/2018 Chen ........................ H04W 4/06

(Continued)

OTHER PUBLICATIONS

International Search Report and the Written Opinion of the International Searching Authority dated Apr. 20, 2020 for PCT Application No. PCT/US2020/015470, 19 pages.

(Continued)

*Primary Examiner* — Hassan A Phillips
*Assistant Examiner* — Gautam Sharma
(74) *Attorney, Agent, or Firm* — Tucker Ellis LLP

(57) ABSTRACT

Systems and methods for multicast send duplication instead of replication in a high performance computing environment. A method can provide a plurality of switches, a plurality of hosts, the plurality of hosts being interconnected via the plurality of switches, wherein a host of the plurality of hosts comprises a multicast sender node, the sender node comprising a system image generation module and a current message sequence module. The method can organize the plurality of switches into two rails, the two or more rails providing redundant connectivity between the plurality of hosts. The method can send two or more duplicate multicast packets on different rails. Upon a receiving node receiving at least two versions of the same multicast packet, only one will be delivered to the communication stack/clients above the layer that handles the encapsulation header.

9 Claims, 20 Drawing Sheets

100

Related U.S. Application Data

(60) Provisional application No. 62/679,478, filed on Jun. 1, 2018, provisional application No. 62/679,465, filed on Jun. 1, 2018, provisional application No. 62/552,818, filed on Aug. 31, 2017.

(56) References Cited

U.S. PATENT DOCUMENTS

| | | | | |
|---|---|---|---|---|
| 2006/0176804 | A1* | 8/2006 | Shibata | H04L 12/185 370/217 |
| 2008/0031130 | A1* | 2/2008 | Raj | H04L 45/22 370/225 |
| 2008/0240095 | A1 | 10/2008 | Basturk | |
| 2008/0267078 | A1* | 10/2008 | Farinacci | H04L 45/02 370/244 |
| 2009/0201803 | A1* | 8/2009 | Filsfils | H04L 45/16 370/222 |
| 2009/0213753 | A1 | 8/2009 | Burrow et al. | |
| 2009/0216901 | A1* | 8/2009 | Schloming | G06F 9/546 709/237 |
| 2009/0245248 | A1* | 10/2009 | Arberg | H04L 45/16 370/390 |
| 2010/0070558 | A1* | 3/2010 | Miura | G06F 11/0709 709/202 |
| 2015/0098466 | A1 | 4/2015 | Haramaty et al. | |
| 2017/0353382 | A1* | 12/2017 | Gupta | H04L 45/28 |
| 2018/0278491 | A1 | 9/2018 | Johnsen et al. | |
| 2018/0351791 | A1 | 12/2018 | Nagarajan et al. | |

OTHER PUBLICATIONS

United States Patent and Trademark Office, Office Action dated Jan. 21, 2021 for U.S. Appl. No. 16/547,335, 11 pages.

* cited by examiner

Provide, at one or more computers, including one or more microprocessors, a first subnet, the first subnet comprising one or more switches, the one or more switches comprising at least a leaf switch, wherein each of the one or more switches comprise a plurality of switch ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, a plurality of virtual machines, wherein each of the plurality of virtual machines are associated with at least one virtual function, and a subnet manager, the subnet manager running on one of the one or more switches and the plurality of host channel adapters. — 1310

Configure a switch port of the plurality of switch ports on a switch of the one or more switches as a router port. — 1320

Logically connect the switch port configured as the router port is to a virtual router, the virtual router comprising at least two virtual router ports. — 1330

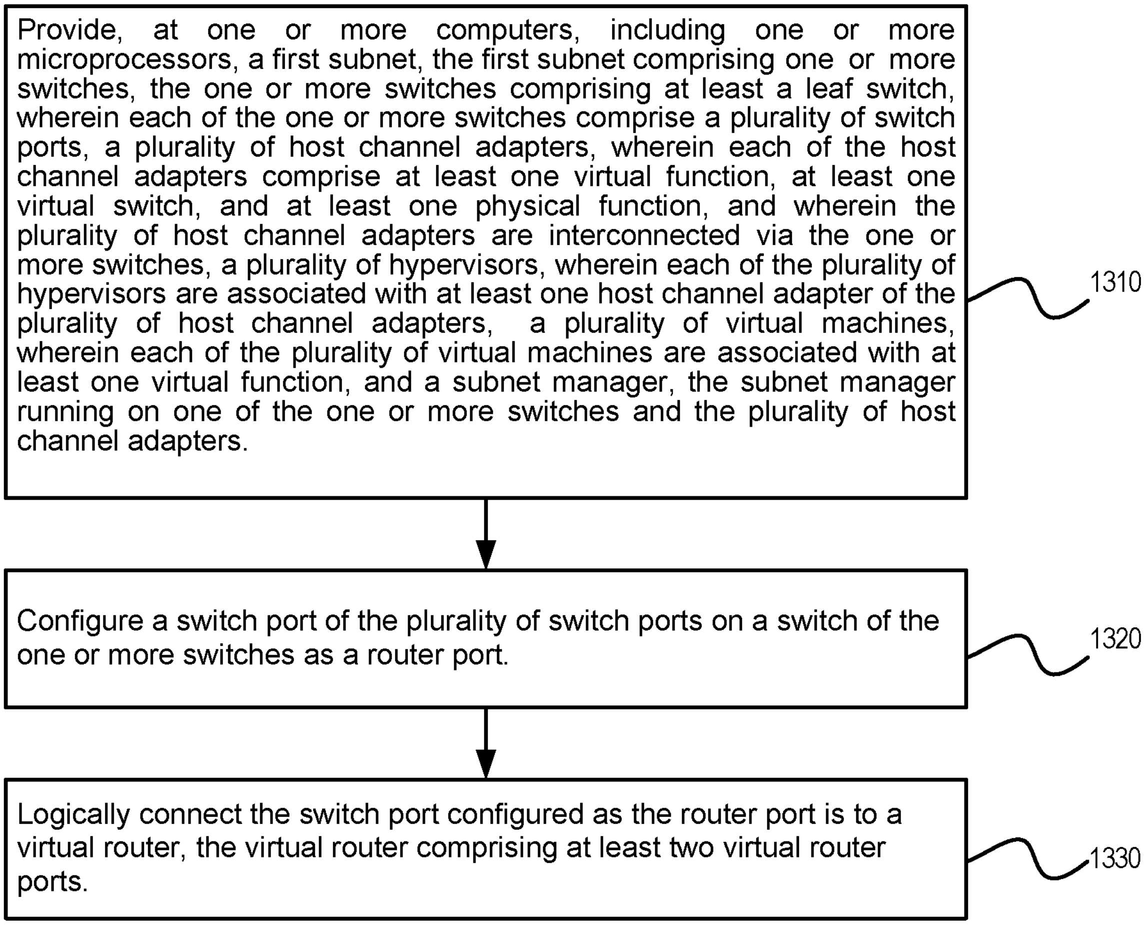

SYSTEM AND METHOD FOR A MULTICAST SEND DUPLICATION INSTEAD OF REPLICATION IN A HIGH PERFORMANCE COMPUTING ENVIRONMENT

CLAIM OF PRIORITY AND CROSS REFERENCE TO RELATED APPLICATIONS

This application claims the benefit of priority to U.S. Provisional Patent application entitled "SYSTEM AND METHOD FOR A MULTICAST SEND DUPLICATION INSTEAD OF REPLICATION IN A HIGH PERFORMANCE COMPUTING ENVIRONMENT", Application No. 62/679,478, filed on Jun. 1, 2018; and is related to U.S. patent application entitled "SYSTEM AND METHOD FOR A REDUNDANT INDEPENDENT NETWORK IN A HIGH PERFORMANCE COMPUTING ENVIRONMENT", application Ser. No. 16/115,138, filed on Aug. 28, 2018; each of which applications are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As larger cloud computing architectures are introduced, the performance and administrative bottlenecks associated with the traditional network and storage have become a significant problem. There has been an increased interest in using high performance interconnects such as InfiniBand (IB) and RoCE (RDMA over Converged Ethernet) technology as the foundation for a cloud computing fabric. This is the general area that embodiments of the invention are intended to address.

SUMMARY

Systems and methods for multicast send duplication instead of replication in a high performance computing environment. A method can provide a plurality of switches, a plurality of hosts, the plurality of hosts being interconnected via the plurality of switches, wherein a host of the plurality of hosts comprises a multicast sender node, the sender node comprising a system image generation module and a current message sequence module. The method can organize the plurality of switches into two rails, the two or more rails providing redundant connectivity between the plurality of hosts. The method can send, by the multicast sender node, two duplicate multicast packets addressed to a multicast local identifier, wherein each of the two or more duplicate multicast packets are sent on a different rail of the two rails. In accordance with an embodiment, the receiving nodes may receive two versions of the same multicast packet, but only one will be delivered to the communication stack/clients above the layer that handles the encapsulation header.

BRIEF DESCRIPTION OF THE FIGURES

FIG. 13 shows a flowchart of a method for supporting dual-port virtual router in a high performance computing environment, in accordance with an embodiment.

DETAILED DESCRIPTION

Figure 1:
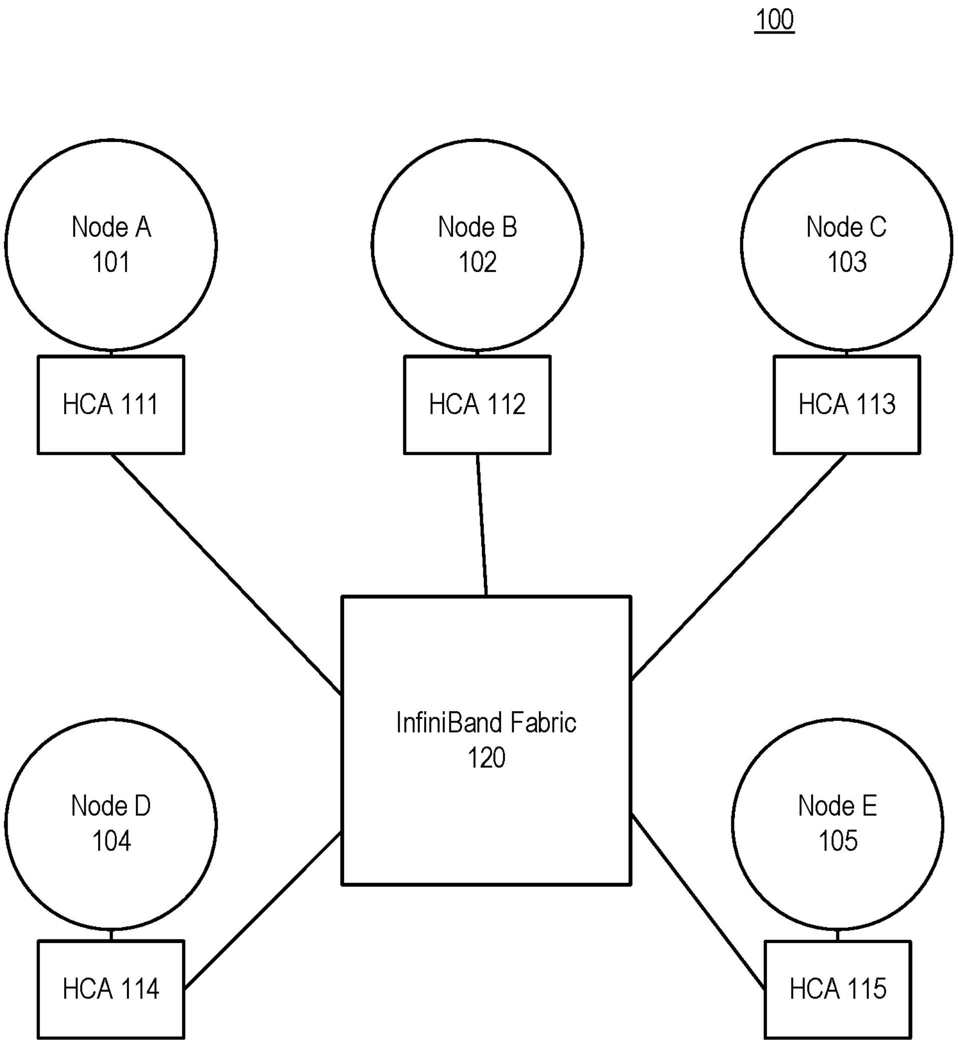
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for multicast send duplication instead of replication in a high performance computing environment.

In some embodiments, the following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

In some other embodiments, the following description uses a RoCE (RDMA (Remote Direct Memory Access) over Converged Ethernet). RDMA over Converged Ethernet (RoCE) is a standard protocol which enables RDMA's efficient data transfer over Ethernet networks allowing transport offload with hardware RDMA engine implementation, and superior performance. RoCE is a standard protocol defined in the InfiniBand Trade Association (IBTA) standard. RoCE makes use of UDP (user datagram protocol) encapsulation allowing it to transcend Layer 3 networks. RDMA is a key capability natively used by the InfiniBand interconnect technology. Both InfiniBand and Ethernet RoCE share a common user API but have different physical and link layers.

In accordance with an embodiment, although portions of the specification contain reference to, in describing various implementations, an InfiniBand Fabric, one of ordinary skill in the art would readily understand that the various embodiments described herein can also be implemented in a RoCE Fabric.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-10V) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
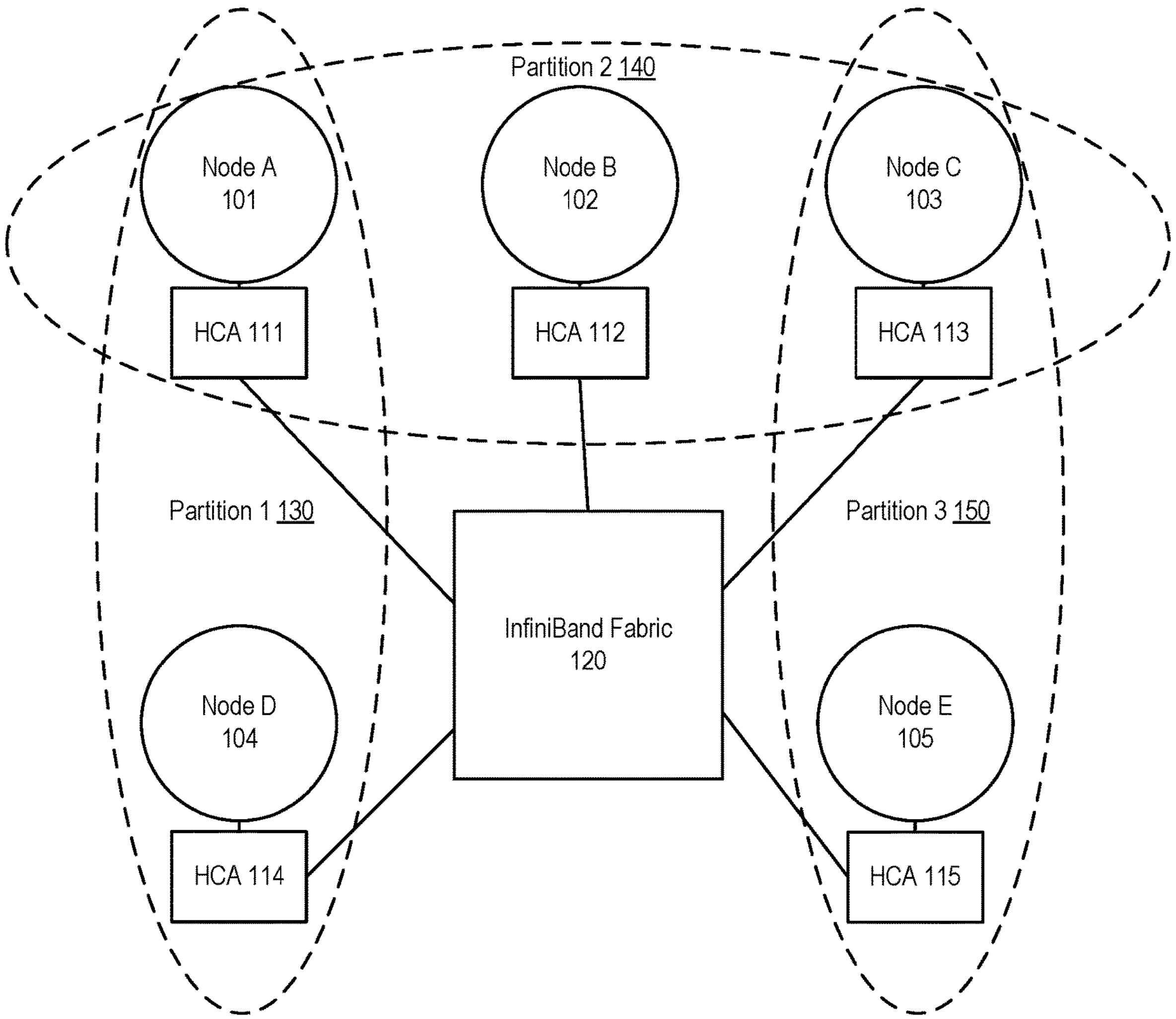
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
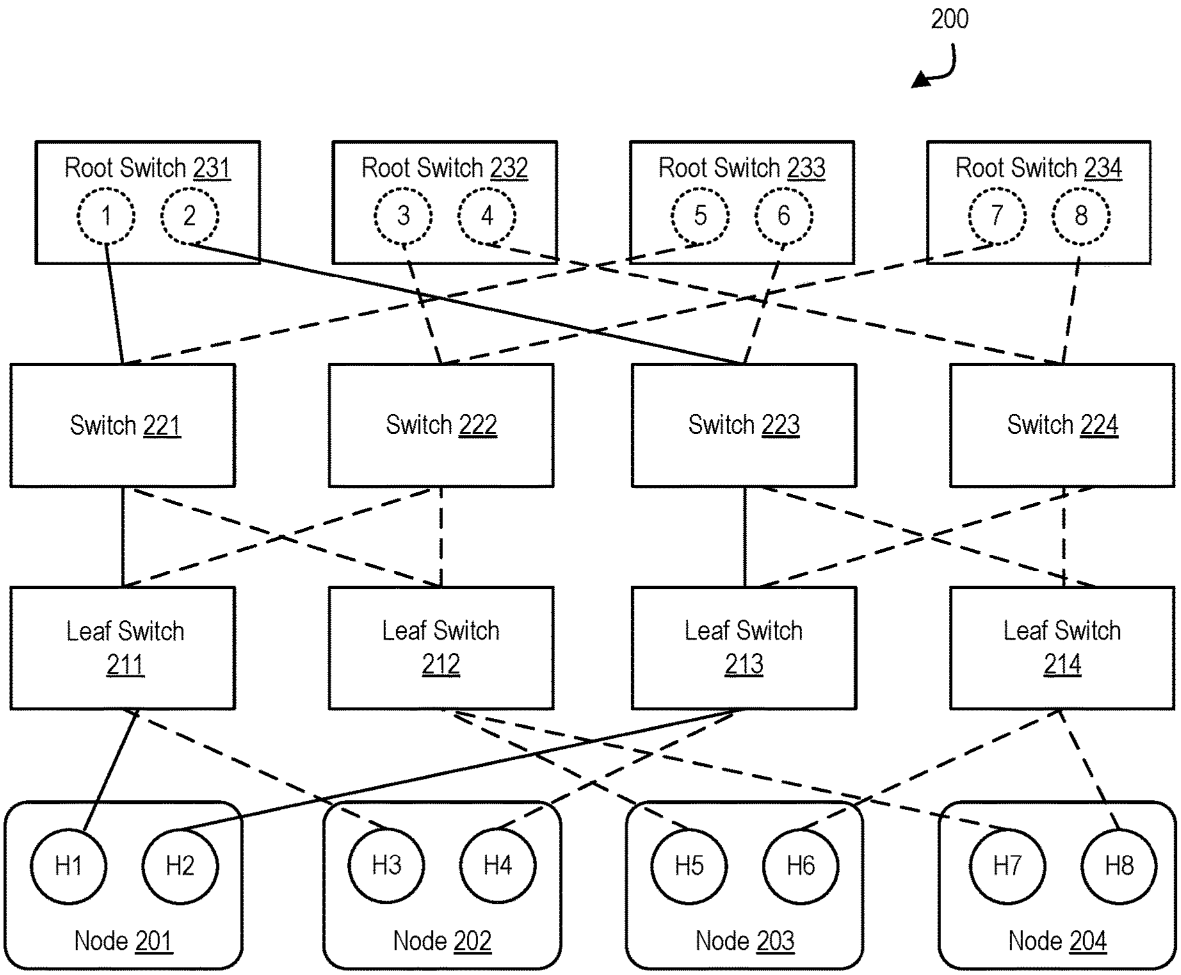
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with $2k$ ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
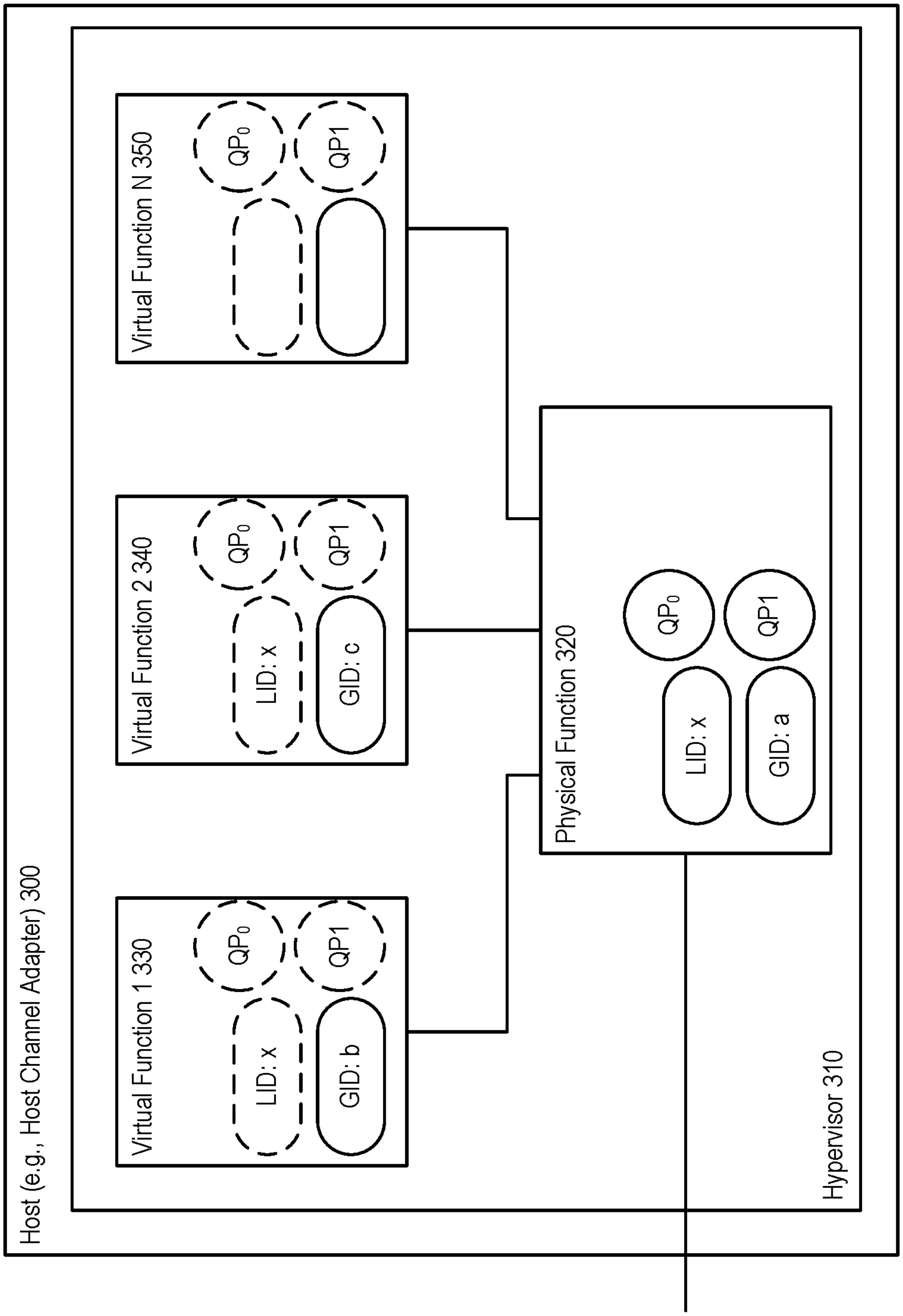
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
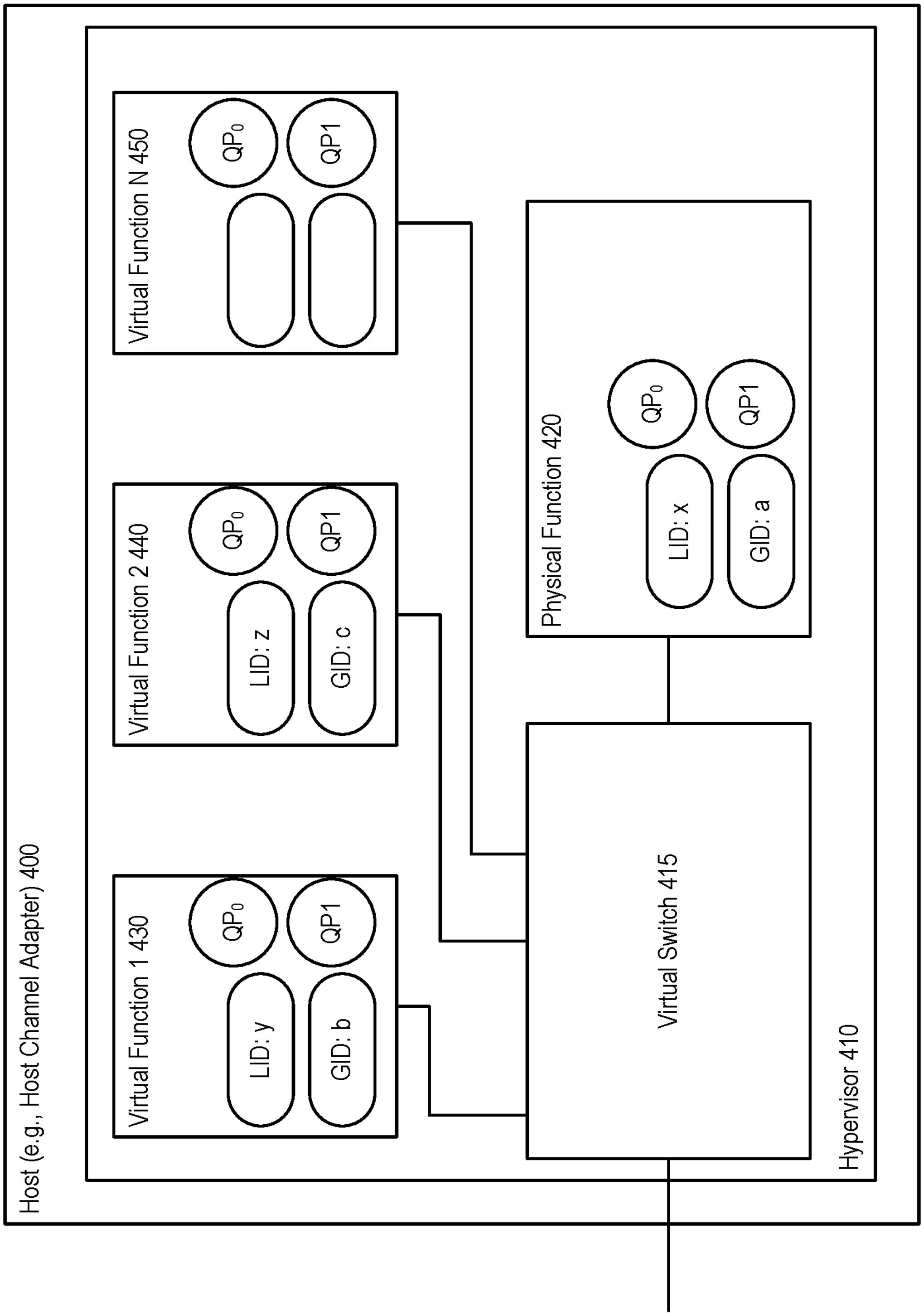
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
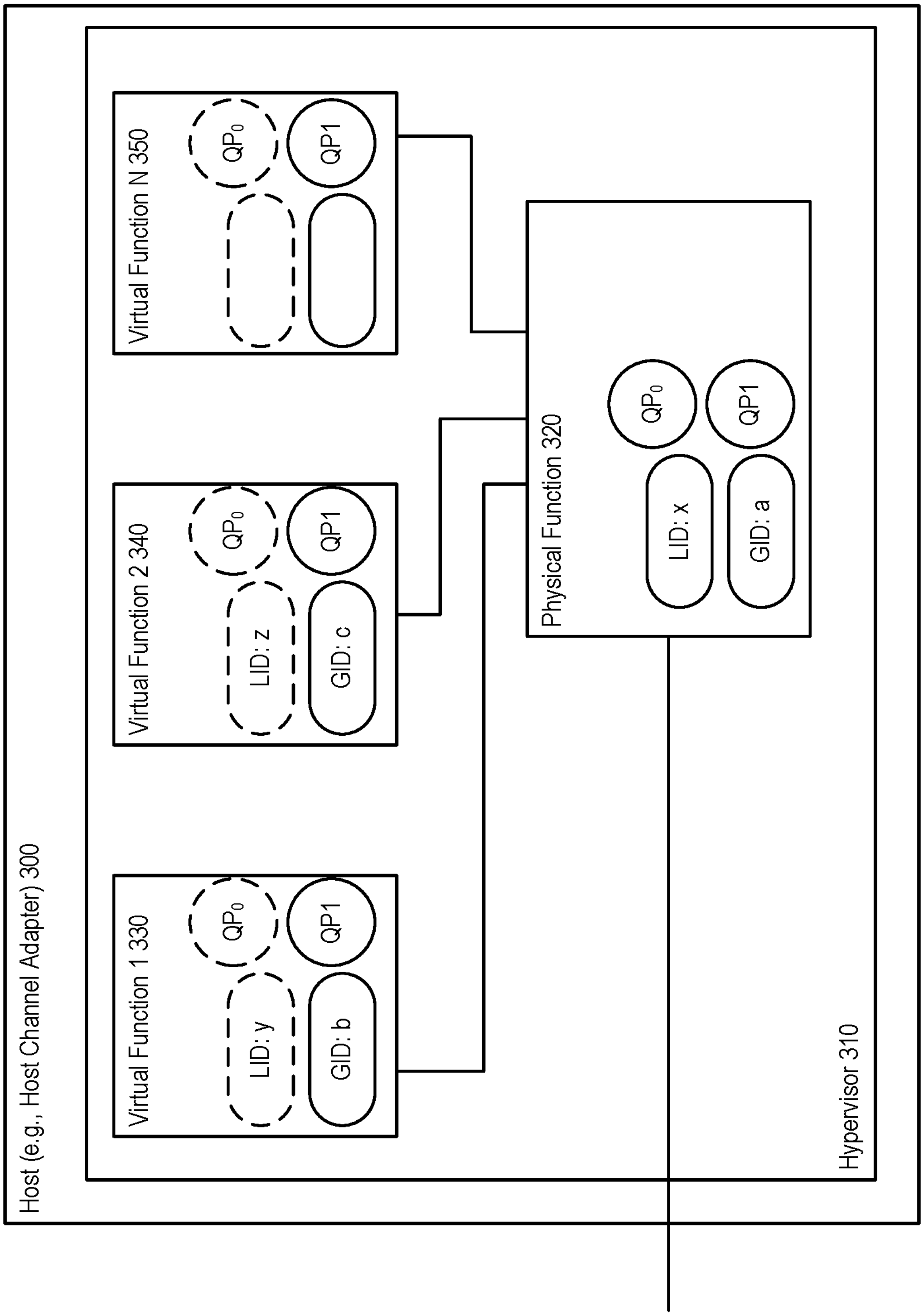
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
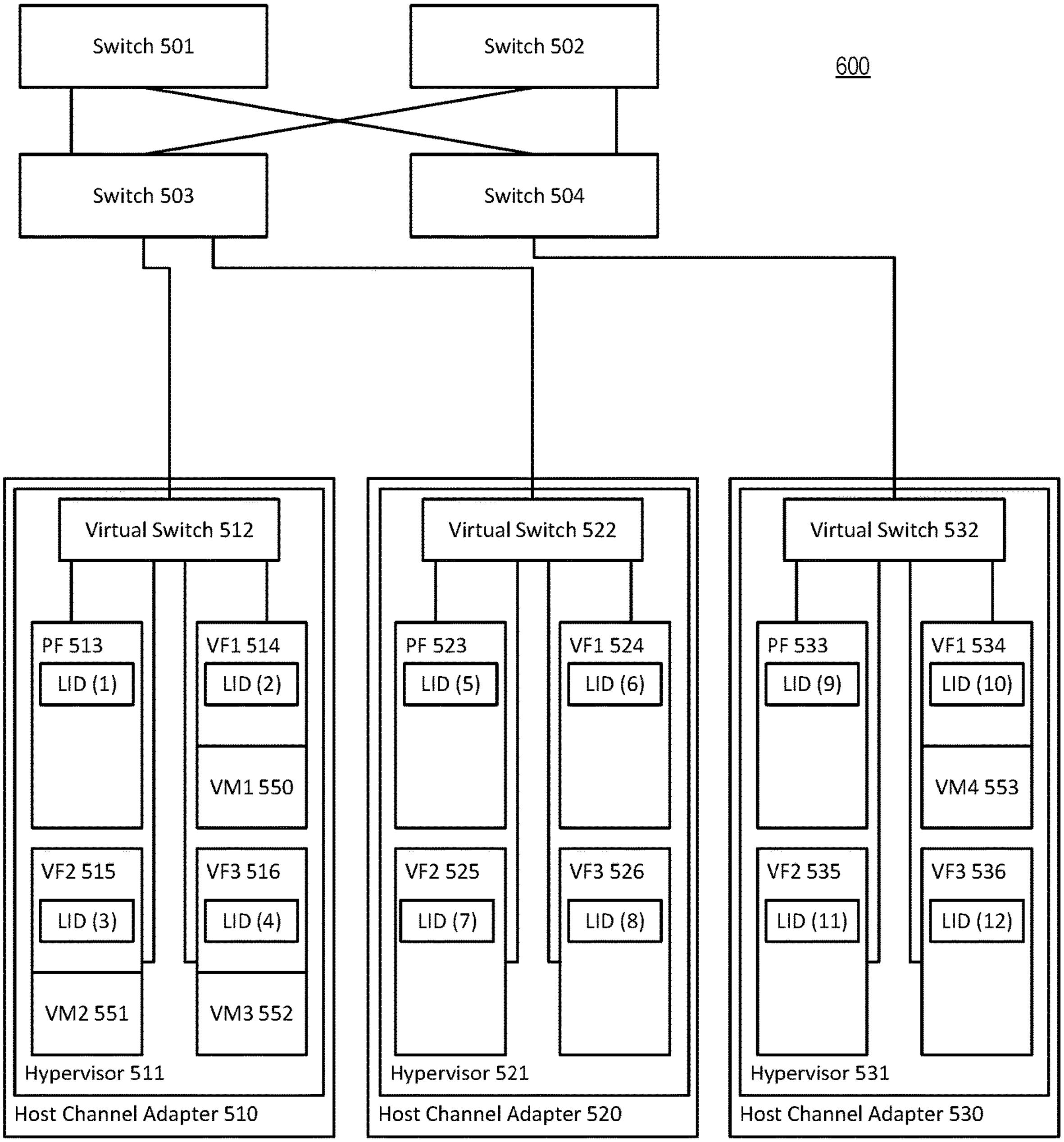
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
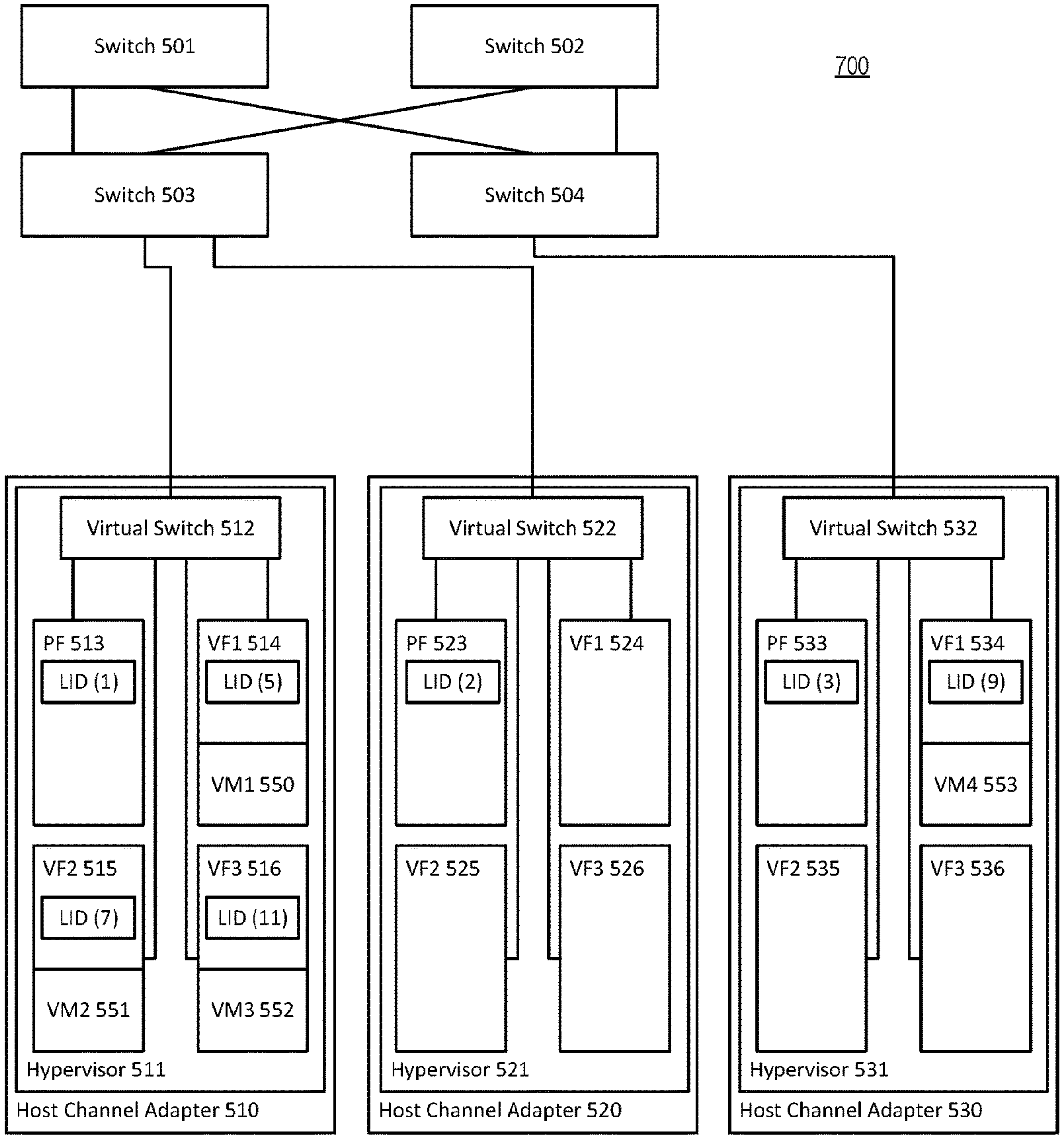
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
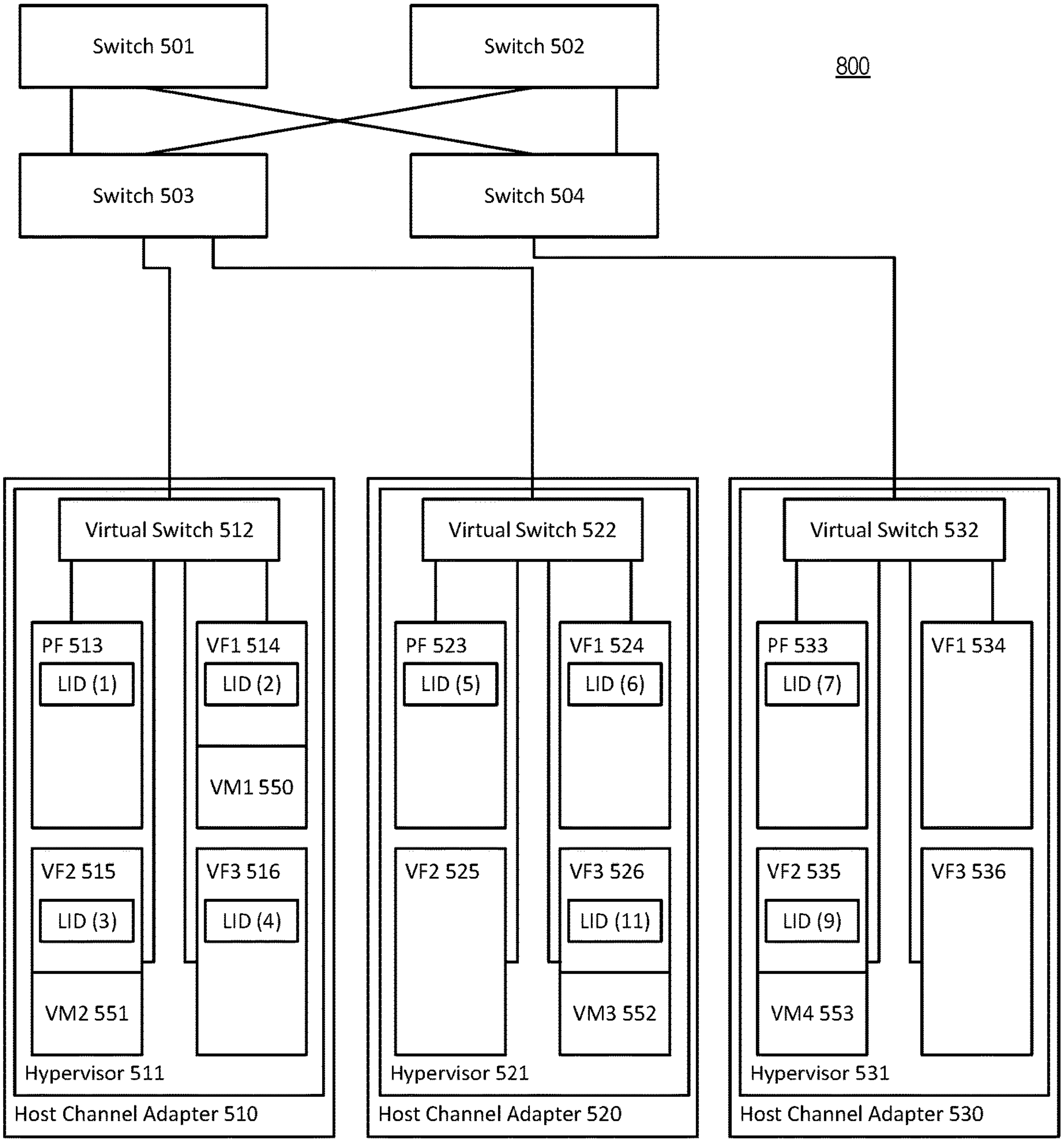
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
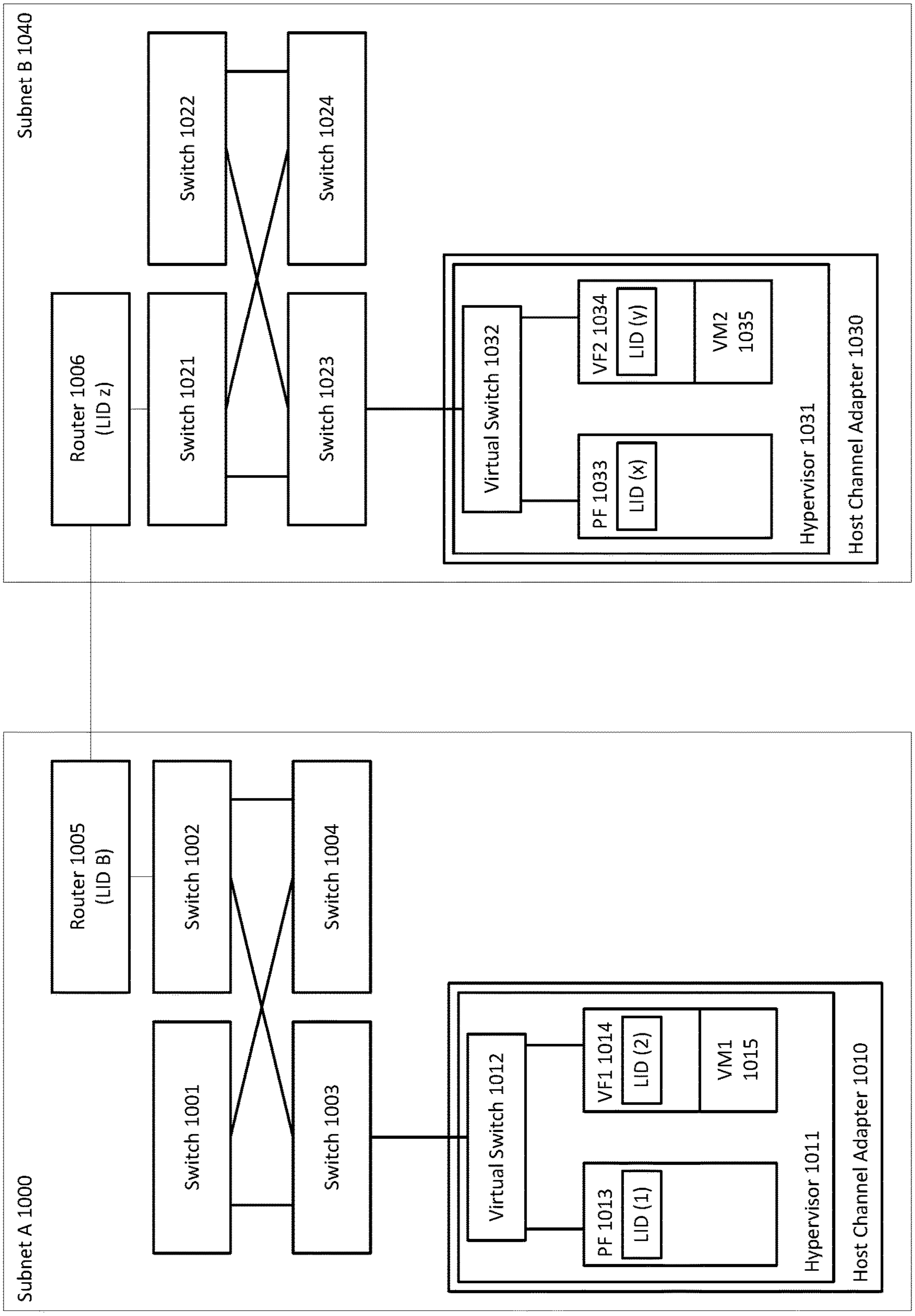
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapter 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapter 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations can follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, create a fabric profile (e.g., a virtual machine fabric profile), build virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination in a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching.

In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet, and without impacting the routing and logical connectivity within either of the incorrectly connected subnets.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
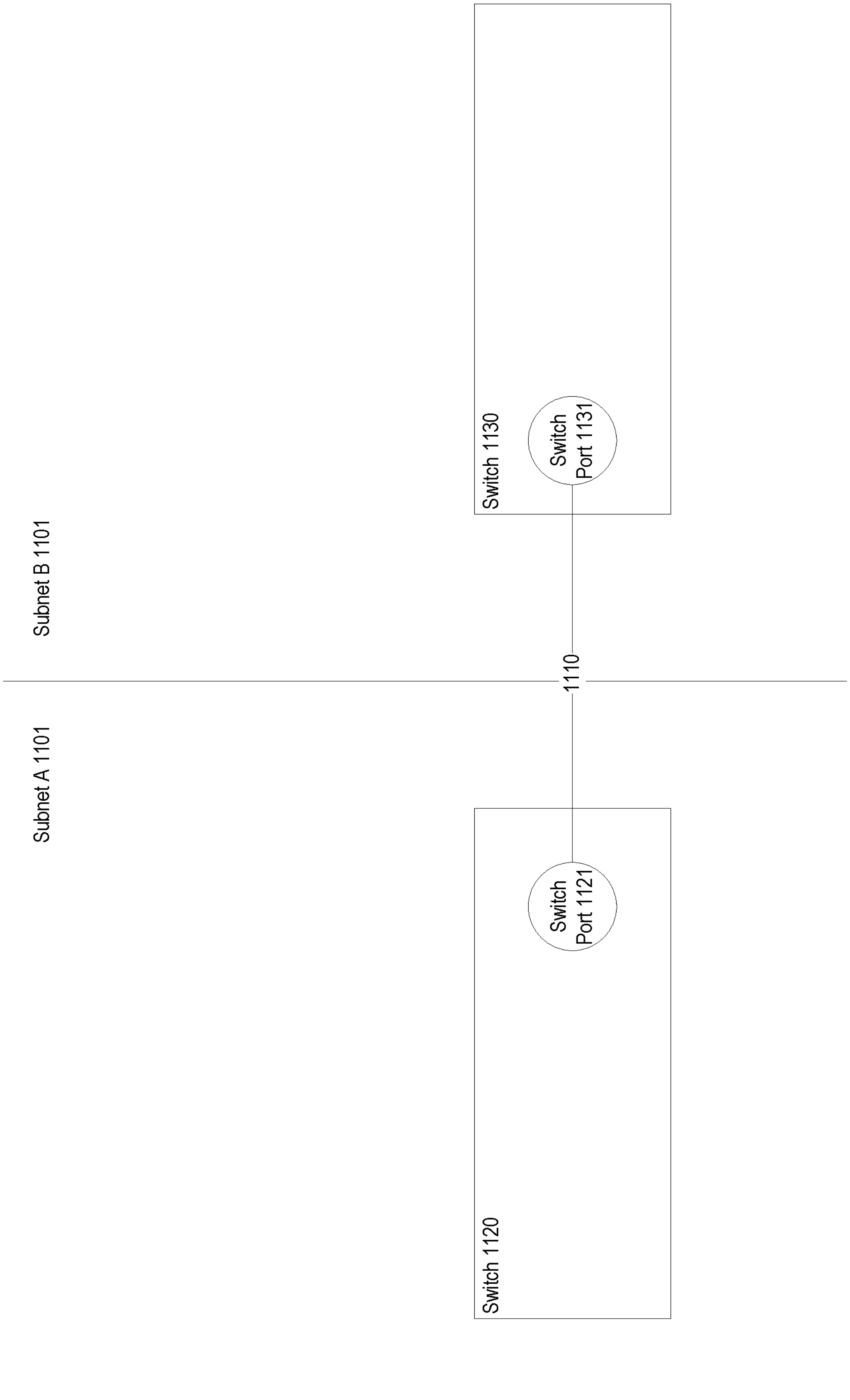
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnetA 1101 can be connected through a switch port 1121 of switch 1120, via a physical connection 1110, to a switch 1130 in subnet B 1102, via a switch port 1131 of switch 1130. In such an embodiment, each switch port, 1121 and 1131, can act both as switch ports and router ports.

In accordance with an embodiment, a problem with this configuration is that a management entity, such as a subnet manager in an InfiniBand subnet, cannot distinguish between a physical port that is both a switch port and a router port. In such a situation, a SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
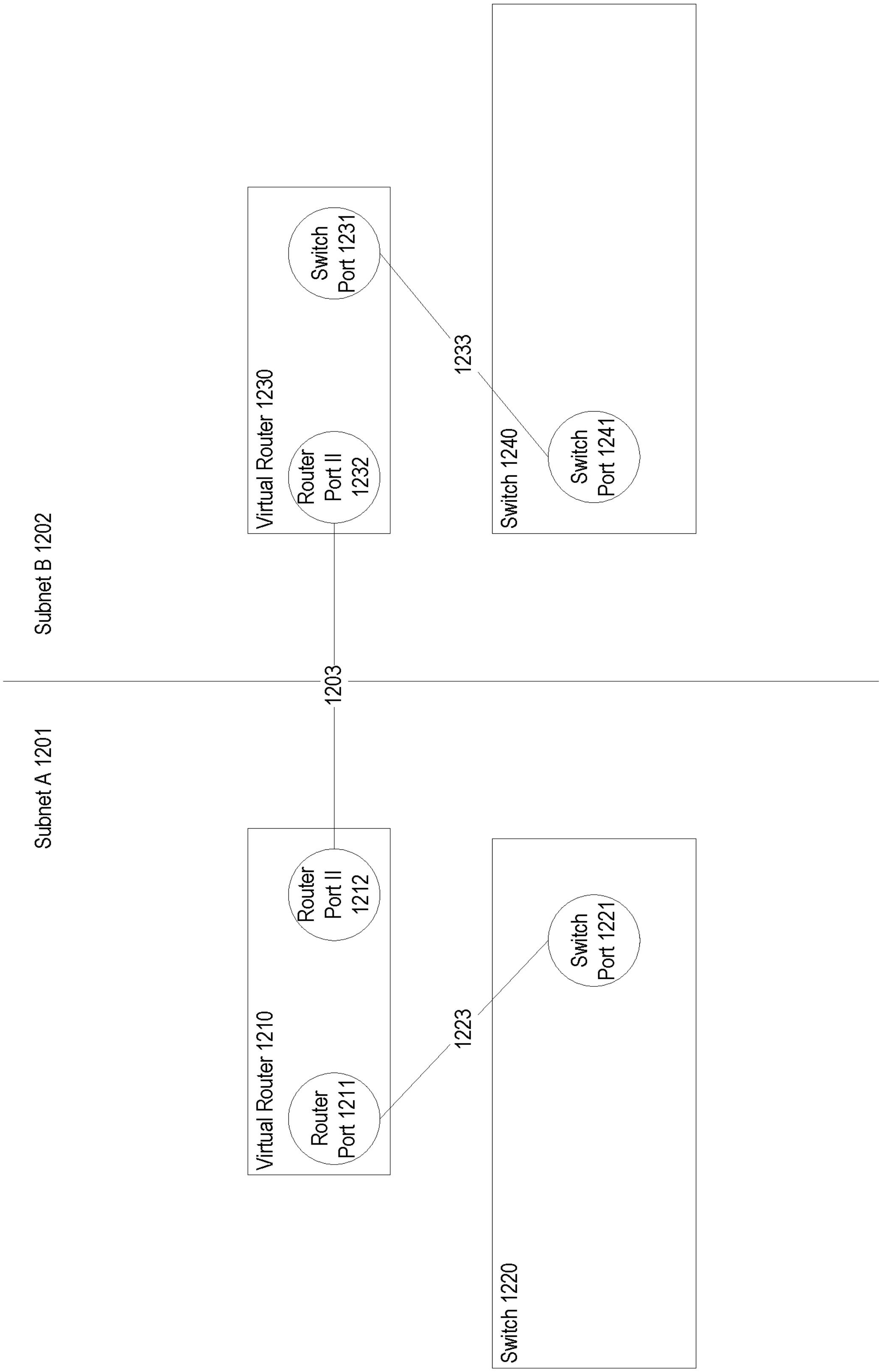
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnetA 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnetA 1201 via first end of the physical link with subnet B 1202 via a second end of the physical link, via router port II 1212 and router port II 1232, contained in virtual router 1230 in subnet B 1202. Virtual router 1230 can additionally comprise router port 1231, which can be connected (i.e., logically connected) to switch port 1241 on switch 1240 via a virtual link 1233.

In accordance with an embodiment, a subnet manager (not shown) on subnetA can detect router port 1211, on virtual router 1210 as an end point of the subnet that the subnet manager controls. The dual-port virtual router abstraction can allow the subnet manager on subnet A to deal with subnet A in a usual manner (e.g., as defined per the InfiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continue to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connected to some other switch port in the same subnet, or to a switch port that was not intended to provide a connection to another subnet. Therefore, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on the local side, a system does not have to provide an external, independent management entity. That is, each side of a subnet to subnet connection can be responsible for configuring its own dual-port virtual router.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

FIG. 13 shows a method for supporting dual-port virtual router in a high performance computing environment, in accordance with an embodiment. At step 1310, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters.

At step 1320, the method can configure a switch port of the plurality of switch ports on a switch of the plurality of switches as a router port.

At step 1330, the method can logically connect the switch port configured as the router port to a virtual router, the virtual router comprising at least two virtual router ports.

Redundant Fully and Semi-Independent Network

In accordance with an embodiment, a mission critical system should work correctly and provide the relevant service with correct data to the correct clients at all times within the expected response time and overall performance constraints defined for the system.

In accordance with an embodiment, for systems implemented as distributed clusters of computers, this also implies that communication between the required set of computers in the cluster must always be operational.

In accordance with an embodiment, a desirable premise for a network communication system to be operational is that all the physical connectivity between components like host adapters and switches is correct in terms of that the correct components and connectors are connected via the correct cables, and that all involved components are configured in the correct way.

In accordance with an embodiment, however, since hardware components can fail and operators can and do mistakes, it is critical that no communication depends solely on any single point of failure in the normal case. If a fault or mistake occurs that prevents communication via one component and communication path, then it is of paramount importance that this is detected and that the communication is failed over to an alternative, redundant communication path immediately—or at least before the non-operational communication path has had any significant impact on system operation or response times.

In accordance with an embodiment, also, whenever a fault is present that leaves some or all current communication vulnerable if a second failure should ever happen, it is important that relevant repair operations can take place ASAP and/or that an additional backup solution may be used to prevent total loss of service.

In accordance with an embodiment, another aspect is that since system and application software is very rarely error free, and also that there is often a need to enhance the system features over time, it is important that it is possible to upgrade the various software components in the system without causing any outages. In a distributed cluster system, this will typically imply a "rolling upgrade" model where redundant components are upgraded in a strict order so that the system is always fully operational with the required set of components and the required communication.

In accordance with an embodiment, also, in order to enhance the capabilities and/or extend the capacity of a system, physical changes in terms of additional HW components and/or replacement of an existing HW component with a more capable one may be required. Such upgrades may then also imply new software and/or firmware in the system.

However, new software and firmware versions as well as new HW versions introduce the risk of introducing new or earlier undetected errors as well as risk of interoperability problems between different software/firmware components on the same or between different nodes in the cluster. Hence, in the ideal case, the ability to operate the system should not depend on that only a single type of software is being used throughout the system, nor on the successful upgrade from one software version to another. In order to achieve this, one approach is to ensure that the required service can be implemented in redundant manner by two sets of hardware components of different types and with different sets of software and firmware, and where either no dependency at all exists between the different sets of redundant components, or only minimal and extremely well defined and controlled dependency exits.

In accordance with an embodiment, one example of such systems is the use of geographically separate systems implemented by different computer types and using different software, but where backup data can be transferred between the systems using a neutral format with minimal dependency on either system. A less strict version of this is that a primary and backup site are using the same type of equipment but are not upgraded at the same time. Hence, typically, the backup site continues to use version N until sufficient confidence has been established for version N+1 at the primary site.

In accordance with an embodiment, another approach is to have several independent implementations of the same functions operating in parallel. This approach has been used in space missions where multiple versions of critical components have been developed by different teams independently of each other. A less extreme version of this approach applied to the cluster communication infrastructure would be to have two independent networks each implemented by gear (HW and SW/FW) from different vendors, but where communication between pairs of computers can fail-over between the two network infrastructures. This approach for network redundancy can then be applied orthogonally to whether different types of computers and host software is used within the cluster in order to provide similar kinds of independence and redundancy at this level also.

In accordance with an embodiment, still, from a pragmatic perspective, cost and complexity are also important factors even when designing mission critical, highly available systems. Hence, different deployments may use different levels of redundancy and different levels of multiple infrastructure types (i.e. if more than a single) in order to fit the budget and the risk scenarios for the relevant system deployment.

In accordance with an embodiment, a fully redundant private fabric is still subject to propagation of management and congestion problems/bugs as well as "disturbance" caused by link failures and reconfiguration from one redundant part to the other when implemented as a single subnet.

In accordance with an embodiment, in order to provide two (or more) fully or semi-independent fabrics, hosts can comprise redundant connectivity to each fabric in order to prevent loss of connectivity if a pair of hosts each have lost a single connection to different independent fabrics.

In accordance with an embodiment, a challenge is to provide redundant connectivity between two fabrics that is independent of the normal management of each fabric and that is used for data communication when no other option exists.

Figure 14:
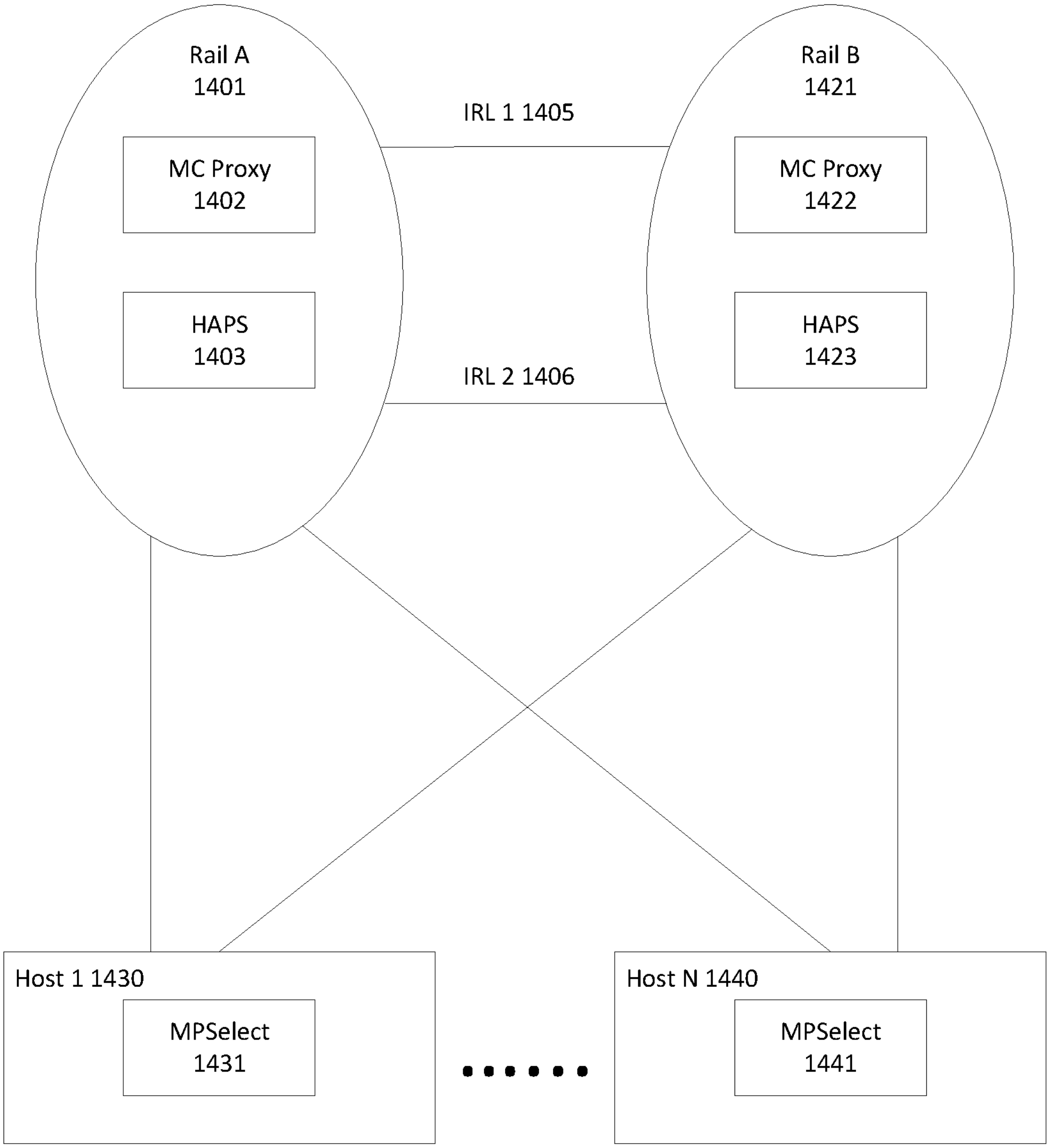
FIG. 14 shows a system for supporting redundant independent networks in a high performance computing environment, in accordance with an embodiment.

FIG. 14 shows a system for supporting redundant independent networks in a high performance computing environment, in accordance with an embodiment.

In accordance with an embodiment, two or more rails, such as Rail A 1401 and Rail B 1421 can be provided. Although not shown, each independent rail can comprise one or a plurality of interconnected switches, as well as a multicast proxy (MC Proxy), such as MC Proxy 1402 and MC Proxy 1422. In addition, each rail can comprise a highly available path service (HAPS), such as HAPS 1403 and HAPS 1423. The rails can be connected to a number of hosts, such as host 1 1430 through host N 1440. Although not shown, each host can comprise one or more end nodes connected to the rail via one or more host channel adapters. In addition, the end nodes can comprise one or more virtual machines, as described above in relation to virtualized environment (e.g., utilizing a virtual switch, virtual port, or other similar architectures as described above or similar in nature). In accordance with an embodiment, each host can comprise a multi-path selection component, such as MPSelect 1431 and MPSelect 1441.

In accordance with an embodiment, the term "rail" can be used to identify both, two, or more independent fabrics/subnets as well as the redundant connections/links from hosts. Each rail can provide a redundant, separated, point to point (for unicast), or point to multiple points (multicast) traffic between end nodes.

In accordance with an embodiment, Rail A and Rail B can be connected via one or more inter-rail links (IRL)

In accordance with an embodiment, the term "IRL" (Inter Rail Link) can be considered of as being similar to an Inter Switch Link (ISL). However, an IRL can be used in a restricted way by not being part of either rail.

In accordance with an embodiment, the term "MC Proxy" can refer to a Multicast Proxy. An MC Proxy can comprise a highly available component that forwards selected multicast packets from one rail to the other (e.g., ARP (address resolution protocol) requests).

In accordance with an embodiment, the term "HAPS" can refer to a HA (highly available) Path Service. HAPS can comprise a highly available component that operates within the context of one rail, but communicates with a peer in the other rail to enable unicast data traffic forwarding via IRL(s) whenever this is required/requested for two hosts to communicate.

In accordance with an embodiment, the term "MPSelect" can refer to a host based HA/Multi-path logic to select which rail to use for different connections to different peer hosts.

In accordance with an embodiment, in a single rack topology, two leaf switches within the rack can represent two rails (i.e., the smallest topology where two rails are separated by hardware). There can be at least two IRLs between the Leaf Switches. In the case of an InfiniBand topology, each Leaf Switch can be a single subnet with an embedded Subnet Manager that is always the master subnet manager for each respective rail.

In accordance with an embodiment, in a multi-rack topology, two Leaf switches in each rack can represent two rails. Each leaf switch in a single rack represents a different rail. At least one Spine switch in each rack. The set of spines is divided into two groups—one for each rail. There can be special handling of dual and 3-rack configuration to avoid single spine is SPOF (single point of failure) in any rail. Leaf switches in one rail are connected to all spines in the same rail (but not to the other). For M>1 IRLs between two or more pairs of spines from each rail. In the case of an InfiniBand topology, redundant SMs can be provided, located on two or more switches (or possibly dedicated hosts) within each rail In accordance with an embodiment, in both single rack and multi-rack topologies, Fat-Tree routing can ignore inter rail links. In the case of an InfiniBand topology, different rails are configured with different M_Keys (management keys) ensuring no Subnet Manager interaction/interference across IRLs.

In accordance with an embodiment, a "HA path service" (HAPS) can keep track of the complete HCA node and port population in each subnet. (This may also include System Image GUID for handling hosts with multiple HCA configurations).

In accordance with an embodiment, the HAPS can use GID-in-service/GID-out-of-service event notification from SA or special protocol. In the case where the HAPS is implemented as a host based service (that may be co-located with MC proxy instance(s)), then no special protocol is required by default for keeping track of node population, but the HAPS will then have a scope that is limited by the partitions that the relevant HCA port can be member of.

In accordance with an embodiment, a HAPS implementation that is co-located with the master SM can have a more direct interaction with the SM, and would not be limited to representing only specific partitions.

In accordance with an embodiment, the HAPS can keep track of switches with "cross-link" ports in each L2 subnet and ensure correct connectivity. This is similar to how an "Inter Subnet Manager" can ensure correct connectivity between peer router ports.

In accordance with an embodiment, the HAPS can establish unicast LID forwarding for "remote LIDs" that require unicast forwarding via cross link. This can in principle be done "independently" of the master SM in the relevant L2 subnet. The requirement would be that the SM can be instructed (configuration policy to use a specific LID range, but still set up an "LinearFDBTop" value for each switch that is based on a separate configuration parameter. In this way, the master SM in each L2 subnet would be operating on non-overlapping LID ranges, but the switches in each L2 subnet would still be able to forward unicast packets with a DLID value in the range belonging to the other (redundant) L2 Subnet.

In accordance with an embodiment, as long as the LID range boundary is aligned on an Linear Forwarding Table (LFT) block boundary, then it is possible for the HAPS to update LFT blocks to manage the unicast cross connectivity independently of (and concurrently with) the master SM in the local subnet. The actual update may be performed directly via SMP operations, or via a special agent on the switches.

In accordance with an embodiment, an alternative scheme is that the HAPS requests the local SM to consider the relevant cross link port to represent all the remote LIDs that are currently required for remote connectivity via this cross-link port. (This is similar to handling of router ports, but a router port only requires a single LID that is handled during the normal subnet discovery/initialization process, whereas this would be a completely new SM operation.)

In accordance with an embodiment, the local Master SM/SA can be provided with path records for remote PortGIDs that reflects the relevant DLID (similar to how an "Inter Subnet Manager" provides path records for remote ports to the local Master SM in a router based context.) Without router ports, the SA can then be able to look up path records based on the supplied info, but can be able to understand that the cross-link port is the "local destination" in the local subnet.

In accordance with an embodiment, if this unicast cross link handling is combined with a scheme where no Path Record Query is required (see, e.g., U.S. patent application entitled "SYSTEM AND METHOD FOR SUPPORTING NODE ROLE ATTRIBUTES IN A HIGH PERFORMANCE COMPUTING ENVIRONMENT", Application No. 15,416,899, filed on Jan. 26, 2017, and U.S. Pat. No. 7,991,006 entitled "Filtering Redundant Packets in Computer Network Equipments", which are herein incorporated by reference), then the local SM/SA does not need to know about paths to remote PortGUIDs at all.

Figure 15:
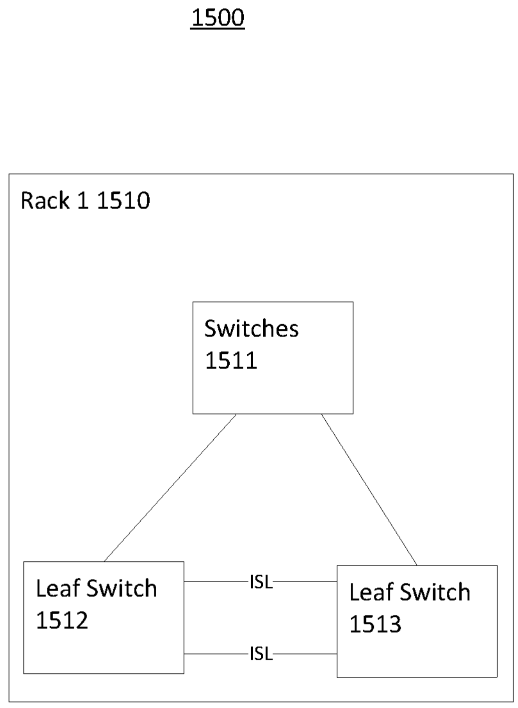
FIG. 15 shows a system for supporting redundant independent networks in a high performance computing environment, in accordance with an embodiment.

FIG. 15 shows a system for supporting redundant independent networks in a high performance computing environment, in accordance with an embodiment.

In accordance with an embodiment, the figure shows a single rack implementation for supporting redundant independent networks in a high performance computing environment.

In accordance with an embodiment, within a single rack topology, the rack can comprise two or more leaf switches 1512-13. The rack can additionally and optionally comprise a number of other switches 1511. These additional switches are optional as the smallest base configuration for a single rack topology are two leaf switches.

In accordance with an embodiment, within a single rack topology with two leaf switches that are interconnected by a set of Inter Switch Links (ISLs) or intr-rail link(IRLs)), two or more rails can be defined either through leaf switch partitioning, by assigning each leaf switch to a distinct rail.

In accordance with an embodiment, in the case of no leaf switch partitioning, depending on switch hardware specific restrictions on packet buffer allocation and switch HW resource organization in general, there may be restrictions on which port numbers can be used for the ISLs.

In accordance with an embodiment, in such a situation, each leaf switch 1512 and 1513 represents a separate rail with the ISLs representing IRLs. In the specific case of an InfiniBand fabric, each leaf switch represents a single subnet with an embedded subnet manager that is a master subnet manager.

In accordance with an embodiment, in a situation where ports on each leaf switch are partitioned in such a way to provide two rails within each leaf switch, then the total number of ports at each leaf switch are divided into two partitions, with each partition representing an independent or semi-independent rail. Within a RoCE fabric partition, there may again be restrictions on which port numbers can be used for ISLs. (By default the same set of ports will be used for ISLs in both the partitioned and not partitioned leaf switch case.)

In accordance with an embodiment, in order to reduce the number of switches required for implementing both the RoCE fabric as well as access to the client network from the private fabric based system in smaller (e.g. quarter rack) configurations, the leaf switches can be partitioned (e.g., the ports on the leaf switches) and used to implement the private RoCE fabric into one physical partition (i.e. set of physical ports/connectors) that represents the private RoCE fabric, and another, non-overlapping partition that represents access to the client network (e.g. the on-premise data-center network). Hence, each such physically partitioned switch can have two non-overlapping sets of ports where only the set of ports that is dedicated to the private RoCE fabric will be allowed to represent connectivity within the RoCE fabric (and vice versa).

Figure 16:
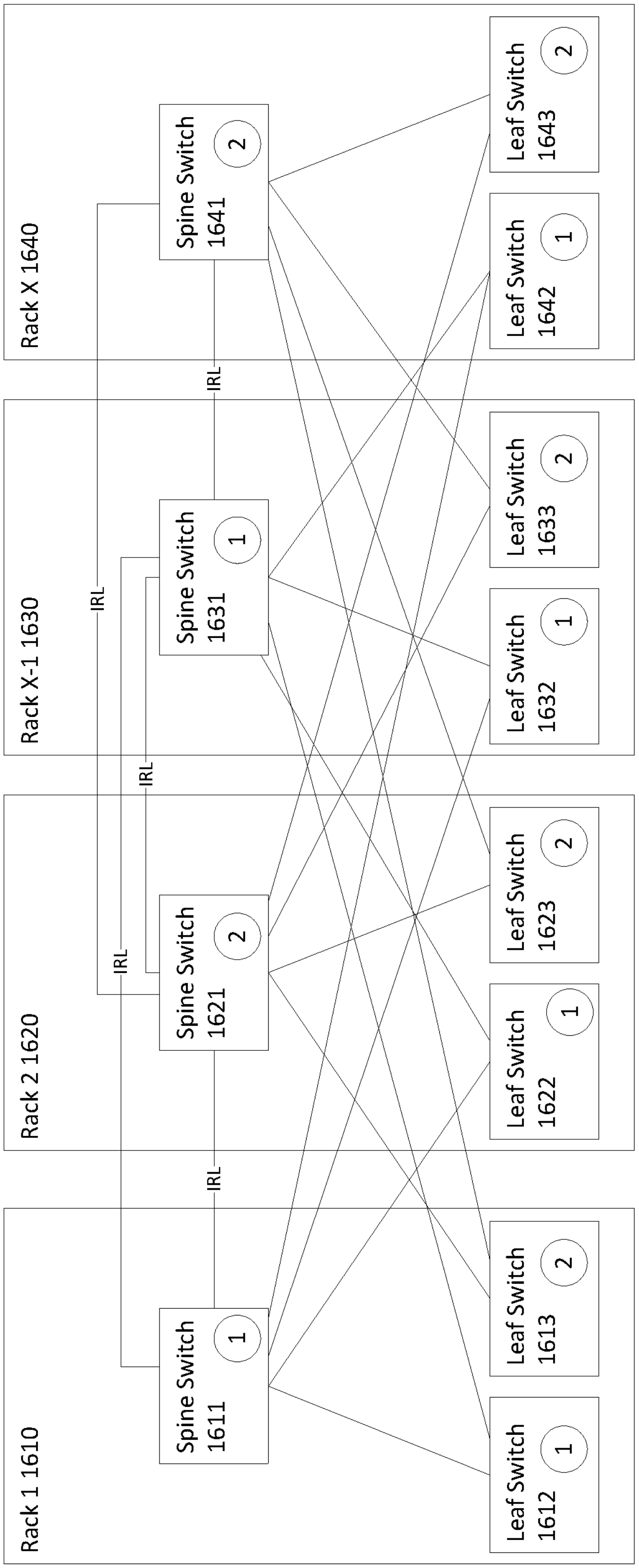
FIG. 16 shows a system for supporting redundant independent networks in a high performance computing environment, in accordance with an embodiment.

FIG. 16 shows a system for supporting redundant independent networks in a high performance computing environment, in accordance with an embodiment.

In accordance with an embodiment, in a multi-rack topology, there can be X number of racks, where each rack comprises a number of switches, including at least a leaf switch. In the depicted embodiment, the system 1600 comprises X racks, including rack 1 1610, rack 2 1620, rack X-1 1630, and rack X 1640. Each rack comprises a number of switches: rack 1 comprises leaf switches 1612-13 and spine switch 1611, rack 2 comprises leaf switches 1622-23 and spine switch 1621, rack X-1 comprises leaf switches 1632-33 and spine switch 1631, and rack X comprises leaf switches 1642-43 and spine switch 1641. Each spine switch also is connected to two inter-rail links, as shown in the figure.

In accordance with an embodiment, in a multi-rack topology, each rack comprises at least two leaf switches, and where the leaf switches belong to separate rails. In the figure, the rail that each switch belongs to is indicated by either a "1" or a "2" shown in each switch. As well, in a multi-rack topology, there is at least one spine switch in each rack. The set of spine switches is divided into two groups, one for each rail. Leaf switches in one rail are connected to all spine switches of the same rail, but not to spine switches of a different rail. There can be M greater than 1 IRLs between two or more pairs of spine switches from each rail. In InfiniBand topologies, redundant subnet managers on two or more switches (or dedicated hosts) within each rail.

In accordance with an embodiment, each leaf switch in each rack has a set of Up-Links that are distributed among all the Spine switches in the fabric. Depending on switch HW specific restrictions on packet buffer allocation and switch HW resource organization in general, there may be restrictions on which port numbers can be used for Up-Links. Each spine switch has a number of Down-Links that are distributed between all the Leaf switches in the fabric.

In accordance with an embodiment, as long as the spine switches are only supposed to provide Down-Link connectivity, there does not have to be any difference in characteristics among different ports. However, since not all Spine ports may be utilized (connected) in a specific configuration, there may still be a reason for restricting which port numbers can be used for Down-Links.

In accordance with an embodiment, in the case of multi-rack configurations, there is typically no use of partitioned leaf switches. Whereas, as indicated above, a single rack configuration may or may not use partitioned Leaf switches. Hence, the fabric definition in the case of single rack configuration can also include information about whether a leaf switch configuration used is partitioned or not. However, smaller multi-rack configurations that are created based on expanding an existing single rack configuration may also use partitioned leaf switches within one or more racks.

In accordance with an embodiment, both single rack topologies and multi-rack topologies can support two different embodiments, namely fully independent rails and semi-independent rails In accordance with an embodiment, for a fully independent rail topology, each rail consists of an independent set of switches, and there is no connectivity between switch ports that belongs to different rails. Typical use case for this is with two or more dual-port adapters per server.

In accordance with an embodiment, in such a case, each server (e.g., host) can have redundant connectivity to each rail. Hence, no single point of failure in terms of a single adapter or a single adapter port for any server may lead to that the corresponding server is NOT able to send and receive data traffic on any individual fabric rail.

In accordance with an embodiment, if two servers do not both have connectivity to at least one common rail, then the pair of servers (or any pair of VMs—one on each of the pair of servers) cannot belong to the same logical cluster where fabric based communication between the cluster nodes are required.

In accordance with an embodiment, in the case where non-overlapping sub-sets of adapters in each server are connected to non-overlapping sets of rails (i.e. there is no adapter that has ports connecting to more than one of the non-overlapping sets of rails), then the different rails are also independent in terms of communication protocols as well as software and firmware versions including both switch firmware, fabric management software, adapter firmware and adapter driver software.

In accordance with an embodiment, the systems and methods described herein can additionally support semi-independent rails.

In accordance with an embodiment, in a semi-independent rail topology, each rail consists of an independent set of switches, and there is no connectivity between switch ports that belong to different rails that are used for data traffic in the normal case. However, "dormant" physical connectivity may exist between switches in different rails in order to be used to provide connectivity between pairs of servers that would otherwise not be able to communicate because they do not both have operational connectivity to the same rail. Such connectivity could be implemented by IRLs or by other means.

In accordance with an embodiment, typical use-case for this configuration is when each server typically has only a single dual port adapter where each adapter port is connected to a leaf switch in a different rail. In this case, any single port/link failure for any server will imply that it cannot send or receive data traffic on the corresponding fabric rail.

In accordance with an embodiment, if two servers do not both have connectivity to at least one common rail, then either some of the "dormant" connectivity between switches in different rails can be utilized to re-establish connectivity between this particular pair of servers, or alternatively, the pair of servers (or any pair of VMs—one on each of the pair of servers) can NOT belong to the same logical cluster where fabric based communication between the cluster nodes are required.

Figure 17:
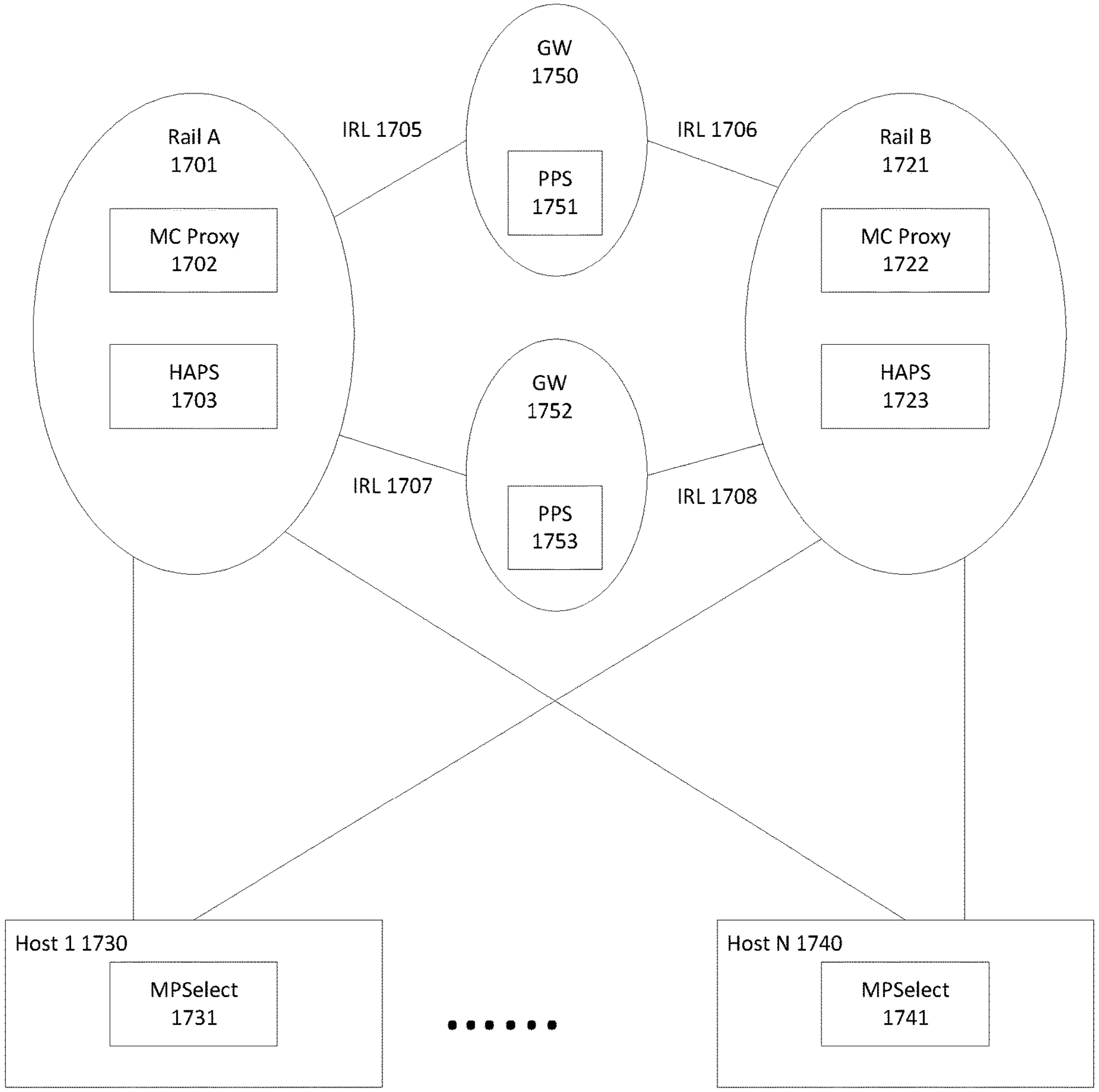
FIG. 17 shows a system for supporting redundant independent networks in a high performance computing environment, in accordance with an embodiment.

FIG. 17 shows a system for supporting redundant independent networks in a high performance computing environment, in accordance with an embodiment.

More specifically, the figure shows a dual-rail topology with IRL gateways.

In accordance with an embodiment, two or more rails, such as Rail A 1701 and Rail B 1721 can be provided. Although not shown, each independent rail can comprise one or a plurality of interconnected switches, as well as a multicast proxy (MC Proxy), such as MC Proxy 1702 and MC Proxy 1722. In addition, each rail can comprise a highly available path service (HAPS), such as HAPS 1703 and HAPS 1723. The rails can be connected to a number of hosts, such as host 1 1730 through host N 1740. Although not shown, each host can comprise one or more end nodes connected to the rail via one or more host channel adapters. In addition, the end nodes can comprise one or more virtual machines, as described above in relation to virtualized environment (e.g., utilizing a virtual switch, virtual port, or other similar architectures as described above or similar in nature). In accordance with an embodiment, each host can comprise a multi-path selection component, such as MPSelect 1731 and MPSelect 1741.

In accordance with an embodiment, instead of direct switch to switch connectivity for the inter rail links 1705-1708, there can be provided a number of gateway instances 1750 and 1752, where each gateway instance provides a packet processing engine, 1751 and 1753.

In accordance with an embodiment, a packet processing engine (PPS) can be provided at nodes in the topology, such as gateway nodes.

In accordance with an embodiment, in order to increase the level of independence between redundant fabrics, dual-port high-performance packet processing engines (PPS) can be used instead of direct switch-switch links for both control and data traffic.

In accordance with an embodiment, these kinds of packet processing engines can be used for additional multiple purposes in a scalable way. These PPS can be used to provide a firewall between different system instances. The PPS can be used to provide a gateway to cloud/data-center network to connect different private fabrics. The PPS can be used to provide a gateway between IB and Enet (Ethernet) based private fabrics. The PPS can be used to provide a gateway between private fabric and client network.

In accordance with an embodiment, systems and methods can keep track of physical and logical connectivity. This can be achieved by leveraging leaf switch monitoring of connected end-ports as well as inter-switch connectivity. Additionally, systems and methods can make use of hierarchical query and reporting schemes in order to distribute all relevant connectivity and aliveness information about all relevant end nodes and ports to all relevant peer nodes. Such reporting can also include nodes and ports that have full connectivity to local leaf switches but where connectivity in the intermediate fabric is limited.

Additionally, systems and methods can leverage adapter/NIC firmware/driver alive-check schemes to detect and report node death (in addition to link failures) to reduce/avoid need for additional peer-peer checks, in addition to facilitating path re-balancing and fail-over.

In accordance with an embodiment, systems and methods can support multicast, address resolution and path selection. Idempotent multicast operations like ARP can be done in parallel on multiple rails. In order to ensure "at least once" semantics for multicast, either selective replication is allowed, or multicast traffic can use an extended protocol that allows receivers to process a single MC message only once. Multiple concurrent address resolution requests to the same node can be responded to by multiple interfaces on different rails and then the requester may select the rail to use for further communication.

Figure 18:
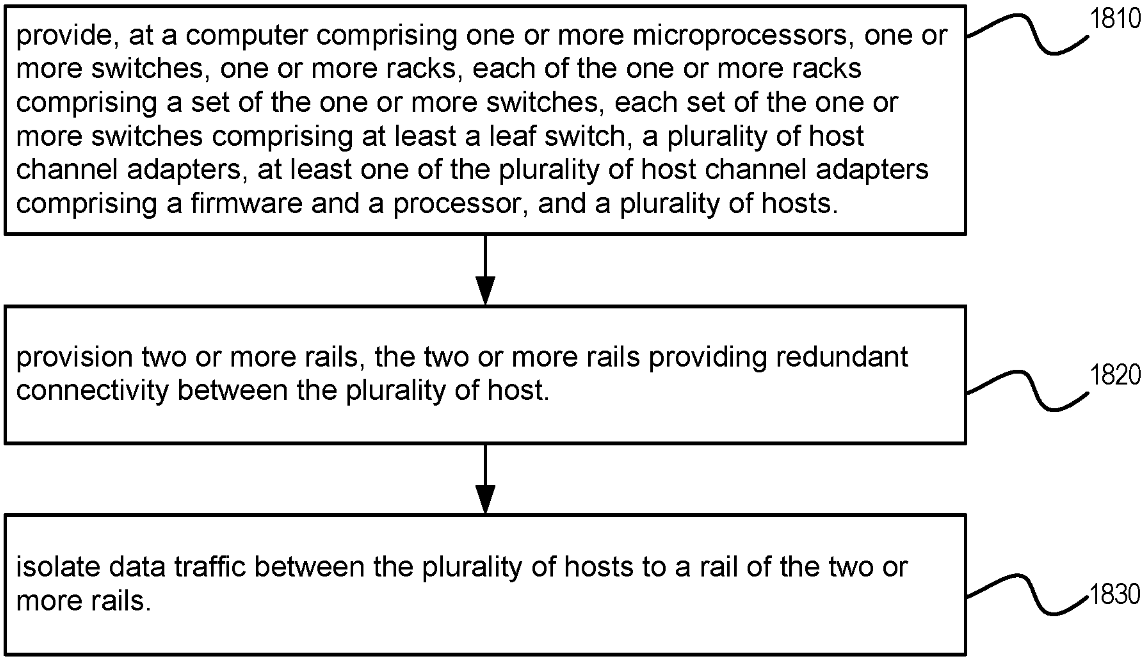
FIG. 18 is a flowchart of a method for a redundant independent network in a high performance computing environment

FIG. 18 is a flowchart of a method for a redundant independent network in a high performance computing environment, in accordance with an embodiment.

At step 1810, the method can provide, at a computer comprising one or more microprocessors, one or more switches, one or more racks, each of the one or more racks comprising a set of the one or more switches, each set of the one or more switches comprising at least a leaf switch, a plurality of host channel adapters, at least one of the plurality of host channel adapters comprising a firmware and a processor, and a plurality of hosts.

At step 1820, the method can provision two or more rails, the two or more rails providing redundant connectivity between the plurality of hosts.

At step 1830, the method can isolate data traffic between the plurality of hosts to a rail of the two or more rails.

In accordance with an embodiment, when implementing a highly available cluster network/fabric it is important that redundancy is implemented in a way that minimizes the risk of problems in one area of the fabric are propagating to other redundant areas of the fabric.

In accordance with an embodiment, also, when a recovery or fail-over action is required within the fabric, it is important that such actions do not impose a load on either control-plane or data-plane infrastructure that can cause significant performance or forward progress issues.

In accordance with an embodiment, in order to allow the system size to scale and also be compatible with legacy highly available host communication run-time systems, each host can have redundant interface connectivity to the fabric, and each such redundant interface can reach any other interface in the redundant fabric. In particular, this implies that if two hosts each are having problems with one interface, then they should still be able to communicate using the remaining operational interface. Hence, interface redundancy can apply to each individual host, and does not have any dependency on which interfaces are available on other hosts.

In accordance with an embodiment, whenever a host interface or a switch fails, it can be possible to re-establish relevant communication without any dependency on which interface is used to initiate such communication. This implies that the network level redundancy cannot be based on two fully independent networks where no packet injected in one of the networks can be forwarded to the other network. Hence, in order to support legacy HA communication schemes while maximizing the independence between redundant networking components, a "semi-independent rail" model can be used.

Goals for the "Semi-Independent" HA Fabric:

In accordance with an embodiment, each redundant host interface should connect to an independent L2 subnet (aka "rail") in the HA fabric.

In accordance with an embodiment, there can exist a single broadcast domain across the two L2 subnets that allows ARP requests from a single interface to reach all other operational host interfaces independently of which L2 subnet each such interface is directly connected to.

In accordance with an embodiment, data traffic (e.g. RDMA) between hosts should not cross between L2 subnets as long as at least one of the L2 subnets has at least one connected and operational interface for each of the hosts.

In accordance with an embodiment, whenever any pair of hosts that need to communicate are not both able to establish data traffic between interfaces on a single L2 subnet, then a path between the L2 subnets should be established for the needed data traffic between the relevant hosts.

In accordance with an embodiment, the host stacks on each host can be able to easily determine which interface to use for communication with a specific other host, —even if the default decision on each hosts involves a different "rail".

In accordance with an embodiment, in the case of InfiniBand, it should not be possible for hosts to initiate SA requests that cross L2 subnet boundaries.

In accordance with an embodiment, it should not be possible for hosts to cause congestion spreading from one L2 subnet to the other.

Specific Implementation Aspects for InfiniBand Fabric:

HA Path Service (HAPS):

In accordance with an embodiment, a "HA path service" (HAPS) can keep track of the complete HCA node and port population in each subnet. (This may also include System Image GUID for handling hosts with multiple HCA configurations).

In accordance with an embodiment, the HAPS can use GID-in-service/GID-out-of-service event notification from SA or special protocol. In the case where the HAPS is implemented as a host based service (that may be co-located with MC proxy instance(s)), then no special protocol is required by default for keeping track of node population, but the HAPS will then have a scope that is limited by the partitions that the relevant HCA port can be member of.

In accordance with an embodiment, a HAPS implementation that is co-located with the master SM can have a more direct interaction with the SM, and would not be limited to representing only specific partitions.

In accordance with an embodiment, the HAPS can keep track of switches with "cross-link" ports in each L2 subnet and ensure correct connectivity. This is similar to how an "Inter Subnet Manager" can ensure correct connectivity between peer router ports.

In accordance with an embodiment, the HAPS can establish unicast LID forwarding for "remote LIDs" that require unicast forwarding via cross link. This can in principle be done "independently" of the master SM in the relevant L2 subnet. The requirement would be that the SM can be instructed (configuration policy to use a specific LID range, but still set up an "LinearFDBTop" value for each switch that is based on a separate configuration parameter. In this way, the master SM in each L2 subnet would be operating on non-overlapping LID ranges, but the switches in each L2 subnet would still be able to forward unicast packets with a DLID value in the range belonging to the other (redundant) L2 Subnet.

In accordance with an embodiment, as long as the LID range boundary is aligned on an Linear Forwarding Table (LFT) block boundary, then it is possible for the HAPS to update LFT blocks to manage the unicast cross connectivity independently of (and concurrently with) the master SM in the local subnet. The actual update may be performed directly via SMP operations, or via a special agent on the switches.

In accordance with an embodiment, an alternative scheme is that the HAPS requests the local SM to consider the relevant cross link port to represent all the remote LIDs that are currently required for remote connectivity via this cross-link port. (This is similar to handling of router ports, but a router port only requires a single LID that is handled during the normal subnet discovery/initialization process, whereas this would be a completely new SM operation.)

In accordance with an embodiment, the local Master SM/SA can be provided with path records for remote PortGIDs that reflects the relevant DLID (similar to how an "Inter Subnet Manager" provides path records for remote ports to the local Master SM in a router based context.) Without router ports, the SA can then be able to look up path records based on the supplied info, but can be able to understand that the cross-link port is the "local destination" in the local subnet.

In accordance with an embodiment, if this unicast cross link handling is combined with a scheme where no Path Record Query is required, then the local SM/SA does not need to know about paths to remote PortGUIDs at all.

Identification and Handling of "Cross-Link" Ports:

In accordance with an embodiment, by default, the redundant InfiniBand L2 subnets can be set up with non-overlapping M_Key ranges prior to that any cross link connectivity would be provided and/or prior to any SMs being active in either L2 subnet. In this way, the SMs in each redundant subnet would not try to discover or configure anything beyond the switch port in the local subnet connecting to the neighbor redundant subnet.

In accordance with an embodiment, it is not expected that an existing operational single subnet based system can be converted into a dual L2 subnet configuration without significant interruption of normal operation. Hence, the expectation is that this kind of reconfiguration will take place in a maintenance window where the system services are not expected to be operational.

In accordance with an embodiment, using Vendor Specific SMA attributes, it will also be possible to establish a protocol that enables explicit configuration of a switch as belonging to a specific redundant L2 subnet, as well as which switch port numbers are supposed to represent cross-link connectivity to the peer redundant L2 subnet.

In accordance with an embodiment, use of Vendor Specific SMA attributes would be similar to how an "Inter Subnet Manager" handles virtual router ports. However, since no router port or port virtualization exists in this context, the implementation will be quite different.

In accordance with an embodiment, based on detailed configuration info and possibly reliance on node-description sub strings, it would be possible to identify and handle cross-link ports also without use of the special Vendor Specific SMA attributes, but this would be more complex and also more exposed to configuration errors.

Specific Implementation Aspects for Ethernet (Private) Fabric:

In accordance with an embodiment, redundancy within interconnect fabrics should as much as possible ensure that failures/problems in one redundant part do not propagate to other parts. Ultimately this implies physically and logically independent infrastructures. However, the cost of this is that either each node can have redundant connectivity to each such independent fabric, or else the ability to recover connectivity between two or more servers each with a single link problem is significantly reduced. By utilizing new ways to provide Ethernet link connectivity between two independent subnets without impacting the management or fault containment for each individual subnet, it is possible to address both goals at the same time.

In accordance with an embodiment, the Ethernet private fabric can be implemented using a conventional Ethernet unicast forwarding scheme with combination of spanning tree and link aggregation variants, or it can be implemented using explicit forwarding of individual unicast destination addresses in the same way as forwarding of IB packets within a single IB subnet is implemented.

In accordance with an embodiment, in the case of explicit forwarding of individual unicast addresses, the high-level scheme is the following:

In accordance with an embodiment, the complete topology in terms of port-port connectivity between switch-ports and between switch ports and end-ports is collected from the relevant set of switches. (Optimizations may include only collecting topology deltas following an initial full discovery.)

In accordance with an embodiment, the topology information is transformed into a format that can be handled by the same routing logic (aka routing engine) that is used for a corresponding InfiniBand fabric.

In accordance with an embodiment, the routing engine uses the topology along with (e.g. VLAN) policy for which physical end ports are allowed to communicate (as well as other relevant optimization and balancing criteria similar to the IB fabric case) and produces a list of end-port address to port mapping tuples for each switch instance in the topology.

In accordance with an embodiment, the resulting (delta) forwarding entry lists are distributed to the switches (i.e. the ones that need updates).

In accordance with an embodiment, multicast can in any case be implemented using legacy Ethernet schemes for both end-port membership handling and forwarding of MC packets.

Multicast Proxy Service:

In accordance with an embodiment, the same/similar considerations as for the InfiniBand case applies. If the L2 source address in the proxied MC packet is not the same as the corresponding ARP request "sender hardware address", then the ARP request may be discarded, or the generation of unicast ARP response may result in an incorrect L2 destination address. As in the InfiniBand case, in order to avoid dependency on special host stack handling, the best approach is that the proxy is able to send out the proxied MC packet with a source L2 address that corresponds to the original sender in the other L2 subnet.

HA Path Service (HAPS):

In accordance with an embodiment, the "HA path service"—HAPS can keep track of the complete end port population in each subnet.

In accordance with an embodiment, the ports that belong to the same NIC or same host can be correlated between the two subnets.

In accordance with an embodiment, as in the IB case, the situation where pairs of hosts are only able to communicate if the relevant unicast traffic is forwarded via cross-links between the two subnets can be identified.

In accordance with an embodiment, in the case where explicit end-port address forwarding is used for unicast traffic then the handling will be very similar to the IB case. However, in the case of legacy Ethernet unicast forwarding, and in the general case, this may require a proxy type gateway function also for unicast traffic.

In accordance with an embodiment, since the unicast forwarding within an Ethernet fabric is based on MACs, then there is no restriction on MAC ranges used for the various L2 subnets. —The only restriction is that each host port should have a MAC that is at least unique within the relevant site/domain. In the case of a private fabric, the relevant domain is then the two redundant L2 subnets.

In accordance with an embodiment, in the case where switches can perform forwarding based on either L2 and/or L3 addresses, it would also be possible to use forwarding based on L3 (IP) addresses instead of L2 MACs.

Identification and Handling of "Cross-Link" Ports:

In accordance with an embodiment, based on that individual switches are configured to belong to different "rails" combined with the neighbor connectivity info from each switch, it is possible to identify both switch-switch connectivity that belongs to the same rail/subnet (fat tree) topology as well as intended (or accidental . . . ) cross-link connectivity.

In accordance with an embodiment, the cross-link connectivity will then never be considered for the normal forwarding of either unicast or multicast connectivity, but the intended cross-connectivity will be used for backup inter-rail paths in the case of explicit end-port address forwarding. As pointed out above, the use of cross-links when legacy Ethernet unicast forwarding schemes are being used would in general require proxy/gateway functions for both multicast and unicast forwarding between different rails.

In accordance with an embodiment, when configuring Ethernet switches and NICs for RoCE based RDMA traffic, the relevant links are usually configured in "loss-less" mode where the down-stream switch or NIC port will generate "pause frames" to the up-stream sending switch or NIC port whenever the available packet receive buffer capacity is below a certain threshold. The sending port will then stop (pause) sending more packets on the relevant priority (if any) until the down-stream port again has buffer capacity above a certain threshold.

In accordance with an embodiment, as with other networking technology where packet flow control can lead to back pressure throughout the network, a lossless RoCE fabric topology must be routed in a deadlock free manner. Also, flows that are supposed to have forward progress independently of each other must use different priorities.

In accordance with an embodiment, in the case of dual-rail topologies, it makes sense to ensure that only the internal topology of a single rail must be considered in terms of deadlock freedom. By configuring cross links as "lossy" (i.e. down-stream switch ports will not send pause frames), it is possible to provide deadlock free routing of the topology in each rail without considering the topology in the rail(s) connected by the cross links. Instead, cross link ports will be considered end-ports within the local rail from a deadlock free routing perspective, and hence they cannot be part of any cycle dependency that could lead to deadlock.

In accordance with an embodiment, the lossless cross link configuration will also imply that no congestion in one rail will spread over to the other rail. Hence, a key requirement for independence between the redundant rails is thereby fulfilled.

Multicast Send Duplication

In accordance with an embodiment, in telecom communications systems the issue of high availability has been paramount for decades and the notion of a "Carrier Grade System" has implied a system that has very low fail-over time before service has been restored. One of the techniques used in such systems is to duplicate all network traffic on dual independent networks based on a protocol extension that allows the receiver to filter incoming traffic so that only one logical packet is forwarded upwards the network stack even if two copies have been received. In the context of very high bandwidth loss-less interconnect fabrics, such duplication is not practical in the general case due to the excessive use of both network bandwidth in the fabric as well as IO bandwidth on the involved servers. However, by selectively using such techniques for multicast traffic, it is possible to significantly reduce the need for explicit multicast replication between independent subnets or encounter timeout situations because individual multicast messages have been lost in the network. A key point is that this can be achieved while preserving the critical semantics that a single multicast message is received "at most once" by each potential receiver.

In accordance with an embodiment, the sender of multicast messages classifies a multicast send operation based on whether it represents an idempotent operation where there is no negative effect if the receiver node(s) should process more than a single copy of the multicast message being sent. In this case, two or more independent multicast messages can be sent via one or more local interfaces and targeting one or more individual multicast addresses. However, if the message does not represent an idempotent operation, then multiple copies of the same message can only be sent as long as message is encapsulated in a network packet that has an encapsulation header that identifies the specific logical message instance in a unique way. The identifier in the encapsulation header will represent a monotonically increasing number specific for the sender so that the receiver can ensure that subsequently received messages with the same identification number will not be forwarded to the higher level protocol stack and/or any receiving application.

In accordance with an embodiment, an aspect of this scheme is that in the case of application level protocols that use multicast based requests and unicast based responses, the same encapsulation schemes can also be used for unicast responses in order to allow the responder to send multiple copies in parallel without risk of confusing the requester with multiple copies. Alternatively, the responder can send only a single normal unicast response, and in that case, it is up to the requester to send a new multicast request with a new instance number in the encapsulation header. In this case it is up to the client/application specific protocol to take care of duplicate messages that are due to retries at the client/application layer.

In accordance with an embodiment, in the case of multicast traffic that is not classified as being either idempotent or not, the default policy could be to use the encapsulation scheme (i.e. the default logical network interface will provide this functionality by default). In this case a different logical interface could be provided for clients/applications that are aware of the alternatives and is capable of doing correct classification.

In accordance with an embodiment, alternatively, the default interfaces could provide legacy functionality and encapsulated traffic would then only be provided for clients/applications that explicitly requests this functionality via a special logical interface.

Implementation:

In accordance with an embodiment, sender nodes can have a persistent "system image generation number" that is incremented and persistently stored every time the relevant node starts up. In addition each sender node will have a "current message sequence number" that is incremented for every message that is sent via logical interfaces that represents encapsulation and duplication. That is, the current message sequence number is the same for each duplicate message for a set of duplicate messages. The message identification in the encapsulation header is then the combination (concatenation) of the "system image generation number" and the "current message sequence number". Then, a receiving node, upon receiving at least two copies of the same message (both being duplicates) can ignore the later arrived message and discard it.

In accordance with an embodiment, in certain embodiments, only one sequence number is generated for the duplicated message independently of how many duplicates are being used. However, it is possible to extend this by leaving some bits (e.g. only one) to encode the rail number that the message was sent on. This can have some value when evaluating traffic and also facilitates more information about potential use of inter-rail links between the two rails. However, it is essential that the receiver recognizes the two (or more) duplicate versions of the same message as duplicates in order to prevent multiple versions to be delivered to receiving applications.

In accordance with an embodiment, a sender node can duplicate a multicast message and send each copy of the multicast message on each of two or more independent, or semi-independent, rails that the sender node has access to.

In accordance with an embodiment, in cases where the persistent "system image generation number" is lost for the relevant sender node, then a special procedure will be performed to ensure that all possible receivers gets informed and are able to reset any expected current identification number for the relevant sender node. Within the context of a highly available cluster configuration, the handling of "system image generation number" can typically be part of the procedure for including a node in the logical cluster. Hence, as long as a node is not included in the cluster, other nodes will not accept any incoming multicast packets from it independently of what "system image generation number" the packet is associated with. The cluster membership handling protocol may decide to exclude a node from the cluster for various reasons, but in particular in a case where it can no longer be communicated with (e.g. because it has crashed or is rebooting for some reason). In this case, the cluster membership decision can be conveyed to the remaining cluster members and can imply that all communication— including multicast communication—with the excluded node is stopped immediately. Whenever the excluded node has rebooted or whenever it is attempting to (re-)join the cluster for any reason, it can negotiate its "system image generation number" as part of the relevant cluster membership join protocol. In this way, it can present its currently next generation number based on having retrieved this from persistent storage, or it can get a new one from the cluster membership control system if no new generation number is readily available to it locally. In either case, the cluster membership control system can ensure that no conflicting generation number can be used.

In accordance with an embodiment, each receiver can maintain dynamic state info for each sender where the ID of the sender node is kept together with currently expected message identifier. Arriving messages with an encapsulation header that represents a higher number will be accepted and forwarded, whereas messages with an already received identifier (i.e. lower value than the currently expected value) will be discarded.

In accordance with an embodiment, in order to more easily separate packets representing encapsulated and duplicated messages from standard network traffic, the protocol can use an alternative protocol identifier at the basic packet layer (e.g. using a special packet/protocol type field at the data link layer). Alternatively, a set of dedicated multicast addresses can be allocated for the purpose of implementing this duplication protocol, and then convey the original multicast address as included in the encapsulation header.

Figure 19:
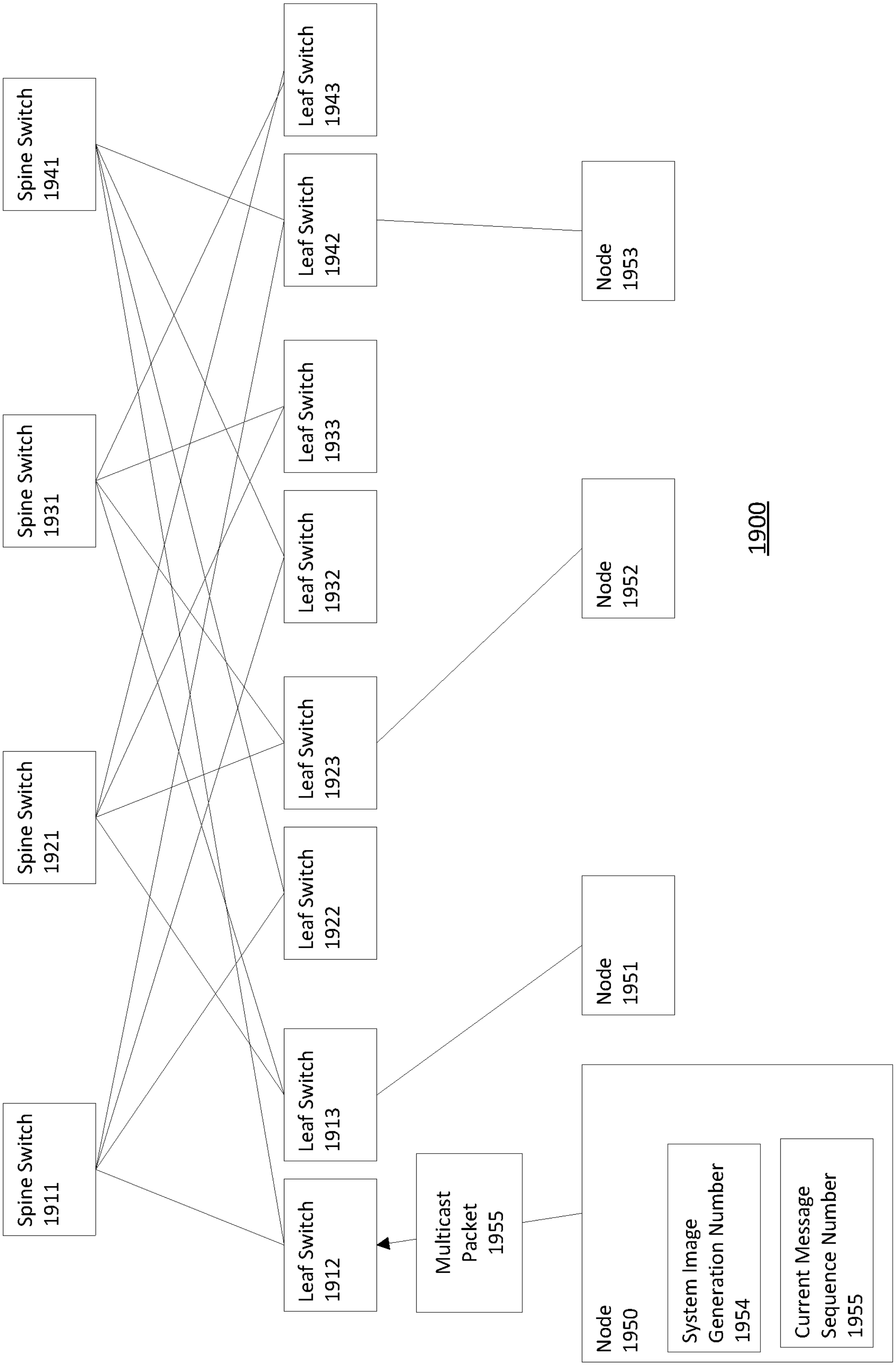
FIG. 19 illustrates a system for multicast send duplication instead of replication in a high performance computing environment, in accordance with an embodiment.

FIG. 19 illustrates a system for multicast send duplication instead of replication in a high performance computing environment, in accordance with an embodiment. In particular, the Figure shows such an implementation on one rail, while other rails are not shown.

In accordance with an embodiment, a system 1900 can comprise a number of switches, such as spine switches 1911, 1921, 1931, and 1941, and leaf switches 1912-13, 1922-23, 1932-33, and 1942-43. These switches can interconnect a number of nodes 1950-1953.

In accordance with an embodiment, sender node 1950 can comprise a persistent "system image generation number" 1954 that is incremented and persistently stored every time the node starts up. In addition, sender node 1950 can comprise a "current message sequence number" 1955 that is incremented for every set of multicast messages that is sent via logical interfaces that represents encapsulation and duplication. A multicast packet 1955, that is sent and addressed to a multicast address (e.g., an MGID), can comprise an encapsulation header that represents a combination of the "system image generation number" and the "current message sequence number".

In accordance with an embodiment, each receiver can maintain dynamic state information for the sender node 1950 where the ID of the sender node is kept together with a currently expected message identifier. Arriving messages with an encapsulation header that represents a higher number will be accepted and forwarded (as it represents a new message), whereas messages with an already received identifier, or a value lower than the expected message identifier, will be discarded as the encapsulation header represents a message that has already been received.

Figure 20:
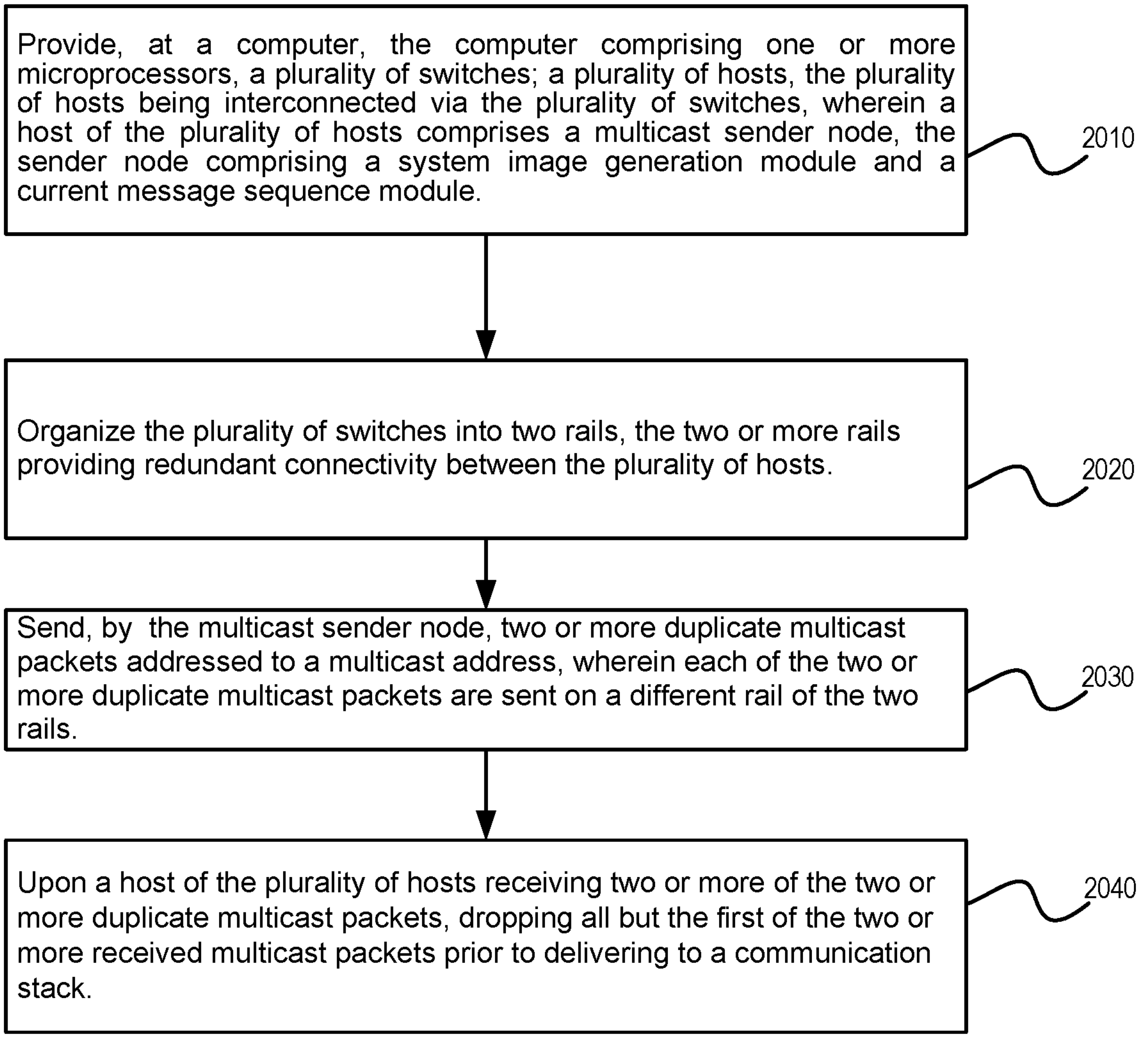
FIG. 20 is a flowchart of a method for multicast send duplication instead of replication in a high performance computing environment.

FIG. 20 is a flowchart of a method for multicast send duplication instead of replication in a high performance computing environment.

In accordance with an embodiment, at step 2010, a method can provide a plurality of switches, a plurality of hosts, the plurality of hosts being interconnected via the plurality of switches, wherein a host of the plurality of hosts comprises a multicast sender node, the sender node comprising a system image generation module and a current message sequence module.

In accordance with an embodiment, at step 2020, the method can organize the plurality of switches into two rails, the two or more rails providing redundant connectivity between the plurality of hosts.

In accordance with an embodiment, at step 2030, a method can send, by the multicast sender node, two duplicate multicast packets addressed to a multicast address, wherein each of the two or more duplicate multicast packets are sent on a different rail of the two rails. The receiving nodes may receive two versions of the same multicast packet, but that only one can be delivered to the communication stack/clients above the layer that handles the encapsulation header.

In accordance with an embodiment, at step 2040, the method can upon a host of the plurality of hosts receiving two or more of the two or more duplicate multicast packets, drop all but the first of the two or more received multicast packets prior to delivering to a communication stack.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for multicast send duplication instead of replication in a high performance computing environment, comprising:

a computer, the computer comprising one or more microprocessors;

a plurality of switches;

a plurality of hosts, the plurality of hosts being interconnected via the plurality of switches, wherein a host of the plurality of hosts comprises a multicast sender node, the sender node comprising a system image generation module and a current message sequence module;

wherein the plurality of switches are organized into two rails, the two or more rails providing redundant connectivity between the plurality of hosts;

wherein the multicast sender node sends two or more duplicate multicast packets addressed to a multicast address, wherein each of the two or more duplicate multicast packets are sent on a different rail of the two rails, wherein each of the duplicate multicast packets comprises an encapsulation header, the encapsulation header comprising a concatenation of the system image generation number and the respective unique current message sequence number;

wherein the system image generation module generates a persistent system image generation number associated with the sender node each time the sender node is started; and wherein the current message sequence module generates a unique current message sequence number and associates the unique current message sequence number with each of the sent two duplicate message packets;

wherein upon sending both of the two duplicate multicast packets which have been assigned the unique current message sequence number, the current message sequence module generates a second unique current message sequence number, the second unique current message sequence number being incremented above the unique current message sequence number; and wherein upon receiving a multicast packet, a receiving node compares the encapsulation header against an expected encapsulation header and:

upon the encapsulation header being equal to or larger than the expected encapsulation header, allows the packet to proceed, and upon the encapsulation header being smaller than the expected encapsulation header, drops the packet.

2. The system of claim 1, wherein the expected encapsulation header is determined based upon the persistent system image generation number associated with the sender node and a prior multicast message, the prior multicast message being associated with a current message sequence number lower than the first of two unique current message sequence numbers.

3. The system of claim 1, wherein each of the duplicate multicast packets comprise an idempotent flag.

4. A method for multicast send duplication instead of replication in a high performance computing environment, comprising:

providing, at a computer, the computer comprising one or more microprocessors, a plurality of switches;

a plurality of hosts, the plurality of hosts being interconnected via the plurality of switches, wherein a host of the plurality of hosts comprises a multicast sender node, the sender node comprising a system image generation module and a current message sequence module;

organizing the plurality of switches into two rails, the two or more rails providing redundant connectivity between the plurality of hosts; and sending, by the multicast sender node, two or more duplicate multicast packets addressed to a multicast address, wherein each of the two or more duplicate multicast packets are sent on a different rail of the two rails, wherein each of the duplicate multicast packets comprises an encapsulation header, the encapsulation header comprising a concatenation of the system image generation number and the respective unique current message sequence number;

wherein the system image generation module generates a persistent system image generation number associated with the sender node each time the sender node is started; and wherein the current message sequence module generates a unique current message sequence number and associates the unique current message sequence number with each of the sent two duplicate message packets;

wherein upon sending both of the two duplicate multicast packets which have been assigned the unique current message sequence number, the current message sequence module generates a second unique current message sequence number, the second unique current message sequence number being incremented above the unique current message sequence number; and wherein upon receiving a multicast packet, a receiving node compares the encapsulation header against an expected encapsulation header and:

upon the encapsulation header being equal to or larger than the expected encapsulation header, allows the packet to proceed, and upon the encapsulation header being smaller than the expected encapsulation header, drops the packet.

5. The method of claim 4, wherein the expected encapsulation header is determined based upon the persistent system image generation number associated with the sender node and a prior multicast message, the prior multicast message being associated with a current message sequence number lower than the first of two unique current message sequence numbers.

6. The method of claim 4, wherein each of the duplicate multicast packets comprise an idem potent flag.

7. A non-transitory computer readable storage medium having instructions thereon for multicast send duplication instead of replication in a high performance computing environment, which when read and executed cause a computer to perform steps comprising:

providing, at a computer, the computer comprising one or more microprocessors, a plurality of switches;

a plurality of hosts, the plurality of hosts being interconnected via the plurality of switches, wherein a host of the plurality of hosts comprises a multicast sender node, the sender node comprising a system image generation module and a current message sequence module;

organizing the plurality of switches into two rails, the two or more rails providing redundant connectivity between the plurality of hosts; and sending, by the multicast sender node, two or more duplicate multicast packets addressed to a multicast address, wherein each of the two or more duplicate multicast packets are sent on a different rail of the two rails, wherein each of the duplicate multicast packets comprises an encapsulation header, the encapsulation header comprising a concatenation of the system image generation number and the respective unique current message sequence number;

wherein the system image generation module generates a persistent system image generation number associated with the sender node each time the sender node is started; and wherein the current message sequence module generates a unique current message sequence number and associates the unique current message sequence number with each of the sent two duplicate message packets;

wherein upon sending both of the two duplicate multicast packets which have been assigned the unique current message sequence number, the current message sequence module generates a second unique current message sequence number, the second unique current message sequence number being incremented above the unique current message sequence number; and wherein upon receiving a multicast packet, a receiving node compares the encapsulation header against an expected encapsulation header and:

upon the encapsulation header being equal to or lamer than the expected encapsulation header, allows the packet to proceed, and upon the encapsulation header being smaller than the expected encapsulation header, drops the packet.

8. The non-transitory computer readable storage medium of claim 7, wherein the expected encapsulation header is determined based upon the persistent the persistent system image generation number associated with the sender node and a prior multicast message, the prior multicast message being associated with a current message sequence number lower than the first of two unique current message sequence numbers.

9. The non-transitory computer readable storage medium of claim 7, wherein each of the duplicate multicast packets comprise an idempotent flag.

* * * * *

UNITED STATES PATENT AND TRADEMARK OFFICE

CERTIFICATE OF CORRECTION

PATENT NO. : 11,102,108 B2
APPLICATION NO. : 16/261362
DATED : August 24, 2021
INVENTOR(S) : Johnsen et al.

It is certified that error appears in the above-identified patent and that said Letters Patent is hereby corrected as shown below:

In the Specification

In Column 2, Line 2, delete "embodiment" and insert -- embodiment. --, therefor.

In Column 2, Line 46, delete "environment" and insert -- environment. --, therefor.

In Column 3, Line 18, delete "http://www.inifinibandta.org," and insert -- http://www.infinibandta.org, --, therefor.

In Column 3, Line 51, delete "(SR-10V)" and insert -- (SR-IOV) --, therefor.

In Column 10, Line 64, delete "SRIOV" and insert -- SR-IOV --, therefor.

In Column 12, Line 15, delete "PF" and insert -- PF. --, therefor.

In Column 17, Line 14, delete "un-intended" and insert -- unintended --, therefor.

In Column 17, Line 19, delete "subnetA" and insert -- subnet A --, therefor.

In Column 17, Line 45, delete "subnetA" and insert -- subnet A --, therefor.

In Column 17, Line 53, delete "subnetA" and insert -- subnet A --, therefor.

In Column 17, Line 61, delete "subnetA" and insert -- subnet A --, therefor.

In Column 21, Line 10, delete "(IRL)" and insert -- (IRL). --, therefor.

In Column 21, Line 50, delete "rail" and insert -- rail. --, therefor.

In Column 23, Line 9, delete "intr-rail" and insert -- inter-rail --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

In Column 24, Line 41, delete “rails” and insert -- rails. --, therefor.

In Column 31, Line 30, delete “IO” and insert -- I/O --, therefor.

In Column 35, Line 14, after “may” insert -- be --.

In the Claims

In Column 37, Line 51, in Claim 6, delete “idem potent” and insert -- idempotent --, therefor.